(12) United States Patent
Furuno

(10) Patent No.: US 6,813,245 B1
(45) Date of Patent: Nov. 2, 2004

(54) ATM COMMUNICATION SYSTEM WITH CONGESTION STATE DETECTING FUNCTION AND CONGESTION STATE DETECTING METHOD IN ATM COMMUNICATION NETWORK

(75) Inventor: Takayuki Furuno, Kawasaki (JP)

(73) Assignee: Fujitsu Limited, Kanagawa (JP)

(*) Notice: Subject to any disclaimer, the term of this patent is extended or adjusted under 35 U.S.C. 154(b) by 0 days.

(21) Appl. No.: 09/473,913

(22) Filed: Dec. 28, 1999

(30) Foreign Application Priority Data

May 25, 1999 (JP) .......................................... 11-145065

(51) Int. Cl.[7] .............................................. G08C 15/00
(52) U.S. Cl. ........................................ 370/236; 370/252
(58) Field of Search .............................. 370/235, 236, 370/236.1, 252, 253, 394

(56) References Cited

U.S. PATENT DOCUMENTS

| | | | | |
|---|---|---|---|---|
| 5,357,510 A | * | 10/1994 | Norizuki et al. | 370/236.2 |
| 5,367,523 A | * | 11/1994 | Chang et al. | 370/235 |
| 5,373,504 A | * | 12/1994 | Tanaka et al. | 370/253 |
| 5,675,574 A | * | 10/1997 | Norizuki et al. | 370/230 |
| 5,694,390 A | * | 12/1997 | Yamato et al. | 370/230 |
| 5,898,689 A | * | 4/1999 | Kumar et al. | 370/232 |
| 6,108,302 A | * | 8/2000 | Murase | 370/230 |
| 6,144,636 A | * | 11/2000 | Aimoto et al. | 370/229 |
| 6,188,674 B1 | * | 2/2001 | Chen et al. | 370/252 |
| 6,519,226 B1 | * | 2/2003 | Kumar et al. | 370/230 |

* cited by examiner

*Primary Examiner*—Chi Pham
*Assistant Examiner*—Keith M. George
(74) *Attorney, Agent, or Firm*—Katten Muchin Zavis Rosenman

(57) ABSTRACT

A method for detecting a congestion state in an ATM network without modifying the ATM network. A transmitter-side endsystem sends, to a receiver-side endsystem an amount of transmission data transmitted to a logical connection in the ATM network. The receiver-side endsystem counts an actually received amount of reception data, and compares the amount of transmission data with the actually received amount of reception data to detect the congestion state. Instead of the amount of the transmission data, a notification of completion of transmission of a predetermined amount of data may be sent to the receiver-side endsystem. In this case, the predetermined amount is stored in advance in both the transmitter-side and receiver-side endsystems, and receiver-side endsystem compares the predetermined amount with the actually received amount of reception data to detect the congestion state until the notification is received after a previous notification.

26 Claims, 23 Drawing Sheets

GFC: GENERIC FLOW CONTROL  VPI: VIRTUAL PATH IDENTIFIER
VCI: VIRTUAL CHANNEL IDENTIFIER  PT: PAYLOAD TYPE
CLP: CELL LOSS PRIORITY  HEC: HEADER ERROR CONTROL

ATM COMMUNICATION SYSTEM WITH CONGESTION STATE DETECTING FUNCTION AND CONGESTION STATE DETECTING METHOD IN ATM COMMUNICATION NETWORK

BACKGROUND OF THE INVENTION

1) Field of the Invention

The present invention relates to an ATM (Asynchronous Transfer Mode) communication system, and a congestion state detection method and an ATM communication device in the ATM communication system.

2) Description of the Related Art

ATM is a technique of transferring information, which is provided with high-speed switching by hardware processing and provides high quality of services (QOS) which is sufficient for realizing multimedia data communication. The ATM technology has been developed as practicable technology by the efforts of the organizations such as the ITU-T (International Telecommunication Union-Telecommunication Standardization Sector) and the ATM Forum.

In addition, various products and services in accordance with a number of standards for the ATM technology have been provided by manufacturers and carriers, and a large market of the ATM products and services has already been developed. In particular, interworking between high-speed, high-quality ATM communication networks for using the Internet. technology over such ATM communication networks are intensively studied. The study is also conducted by IETF (the Internet Engineering Task Force), in addition to the above organizations.

The ATM technology was first used as a backbone of a LAN (Local Area Network). At that time, a typical LAN used the Ethernet, and the mainly used transmission rate of the Ethernet was 10 Mbps or 100 Mbps. On the other hand, the mainly used rate of interface of ATM communication networks was 156 Mbps. Therefore, the ATM communication networks functioned well as a backbone of the above LAN. Recently, the 100 Mbps Ethernet is dominant, and further the Gigabit Ethernet having the transmission rate of 1 Gbps is supplanting the ATM.

However, faster interfaces for ATM, such as ATM interfaces having the transmission rates of 2.4 Gbps and 10 Gbps, have been standardized, while the speeding up of the Ethernet seems to be near the limit.

Under the above circumstances, the ATM technology was next used in a wide area service in which a plurality of private networks (e.g., LANs) are connected to each other. Although, conventionally, high-speed digital dedicated-line services are mainly used for connections between the private networks in a wide area service, only a small number of predetermined transmission rates are provided by such high-speed digital dedicated-line service, and gaps-between the values of the predetermined transmission rates are great. Therefore, it is necessary to bundle more than one dedicated line or use a dedicated line having excessive bandwidth for satisfying user's requirement.

On the other hand, in the ATM dedicated-line services, virtual channels (VCs) can be set as permanent virtual connection in small unit amounts. For example, in the ATM Mega Link Service, which is currently provided by NTT Communications Corporation in Japan, users can select the transmission rate in 1 Mbps increments in the range of 1 to 135 Mbps. As another example, the Super Relay Service is a virtual channel (VC) service, which is also provided by NTT Communications Corporation in Japan. The Super Relay Service provides a number of options for the transmission rate, such as 16 Kbps, 32 Kbps, 48 Kbps, . . . 1 Mbps, 2 Mbps, . . . 10 Mbps, in the low transmission rate range, and a switched virtual connection (SVC) service.

In addition, due to the statistical multiplexing gain in the ATM technology, network service providers can reduce equipment investment and lower service tariff to reduce users' cost. It is expected that the ATM services are further diversified in the future to provide further options corresponding to various needs of users.

In the ATM services, a plurality of service categories are provided to cope with various traffic characteristics. For example, the ATM Forum Traffic Management Specification Version 4.0 (af-tm-0056.0) provides the following four service categories:

(i) CBR (Constant Bit Rate)

In the CBR service, users' cell transmission rates are completely guaranteed within a range defined by a Peak Cell Rate (PCR). The service category CBR achieves quality corresponding to the conventional dedicated-line service.

(ii) UBR (Unspecified Bit Rate)

The UBR service is a best-effort service, in which users' cell transmission rates are not guaranteed even under the PCR. When congestion occurs in the network, cells may be discarded. In ATM-LANs, traffic is generally controlled in the manner of the UBR service.

(iii) VBR (Variable Bit Rate)

The VBR service guarantees a contracted Sustainable Cell Rate (SCR) as an average of cell transmission rates from a user when congestion does not occur in the network. For cell transmission rates exceeding the Sustainable Cell Rate (SCR) and not exceeding the PCR, the VBR service is a best-effort service like the UBR service. It is generally said that the VBR service is suitable for bursty traffic.

(iv) ABR (Available Bit Rate)

The ABR service guarantees users' cell transmission rates under a Minimum Cell Rate (MCR). In addition, the ABR service includes notification of a state of resources in the network or a receiver-side (destination) endsystem to a transmitter-side (source), endsystem. Therefore, the transmitter-side endsystem can vary a cell transmission rate between the Minimum Cell Rate (MCR) and the Sustainable Cell Rate (SCR) in response to the notified state of resources.

Only three of the above service categories, CBR, UBR, and VBR, are provided in the ATM communication networks currently operating in the world. However, the UBR and VBR services do not include notification of congestion, although cells may be discarded under these services. That is, the currently operating networks do not have a function of notifying an endsystem of occurrence of congestion.

FIG. 24 shows endsystems which transmit cells from one to the other through an ATM communication network. In FIG. 24, the endsystems are ATM routers 100 and 200, and the ATM communication network 300 does not have the function of notifying an endsystem of occurrence of congestion. Therefore, endsystems such as ATM routers 100 and 200 in FIG. 24 cannot perform, in the ATM layer, control (e.g., reduction) of cell transmission rates corresponding to the occurrence of congestion (i.e., discard of a cell) in the ATM communication network such as the network 300 in FIG. 24, and the endsystems using the UBR or VBR service of the conventional ATM communication network usually send cells at the PCR on the premise that cells may be discarded.

As described above, when the UBR or VBR service of the conventional ATM communication network is used, cells may be discarded due to occurrence of congestion. Nevertheless, the current network does not have functions of detecting and notifying the occurrence of congestion. Actually, ATM-exchanges or the like which constitute the ATM communication network do not have the above functions. Thus, endsystems cannot be informed of the occurrence of congestion (and discard of a cell), and therefore cannot perform cell rate control for coping with or avoiding the occurrence of congestion.

If a function of retransmitting a discarded cell is provided in another layer above the ATM layer, it is possible to recover information contained in the discarded cell. However, the congestion per se cannot be avoided unless the cell rate control is performed in the ATM layer.

On the other hand, if the ATM communication network provides the aforementioned ABR service, the ATM communication network has the function of notifying an endsystem of occurrence of congestion. Therefore, endsystems can recognize the occurrence of congestion, and perform the cell rate control. However, in order to implement the ABR service in the conventional ATM communication network, all of the endsystems and the ATM communication network including all the ATM exchanges and other constituents of the ATM communication network need substantial modification. Therefore, considering design, manufacturing, and cost, it is not advantageous to modify the conventional ATM communication network for implementing the ABR service function. In addition, it lacks flexibility in construction of the network.

In addition, the ABR service must guarantee the bandwidth for the Minimum Cell Rate (MCR) completely. Therefore, the ABR service may preoccupy bandwidth for other services to impede effective utilization of resources (in particular, bandwidth). Namely, the implementation of the ABR service is disadvantageous.

SUMMARY OF THE INVENTION

An object of the present invention is to provide an ATM communication system containing an ATM communication network and a plurality of endsystems, wherein a congestion state of the ATM communication network can be detected easily by the endsystems without modification of or functional addition to the ATM communication network.

Another object of the present invention is to provide a congestion state detection method executed in the ATM communication system containing an ATM communication network and a plurality of endsystems, whereby a congestion state of the ATM communication network can be detected easily by the endsystems without modification of or functional addition to the ATM communication network.

A further object of the present invention is to provide an ATM communication device which can be connected to an ATM communication network for transmitting cells to and receiving cells from a second ATM communication device connected to the ATM communication network, where the ATM communication device can detect a congestion state of the ATM communication network or assist the second ATM communication device in detecting a congestion state of the ATM communication network.

According to the first aspect of the present invention, there is provided an ATM communication system having an ATM communication network and a plurality of ATM communication apparatuses connected to the ATM communication network, where data is transmitted from a first one of the plurality of ATM communication apparatuses to a second one of the plurality of ATM communication apparatuses through a logical connection set in the ATM communication network. The first one of the plurality of ATM communication apparatuses contains a transmission-data-amount counting unit which counts an amount of transmission data to the logical connection, and a notification processing unit which sends to the second one of the plurality of ATM communication apparatuses a notification containing the amount of transmission data counted by the transmission-data-amount counting unit. The second one of the plurality of ATM communication apparatuses contains a reception-data-amount counting unit which counts an amount of reception data which have been received from the logical connection, and a congestion-state detecting unit which can detect a congestion state of the ATM communication network by comparing the amount of transmission data contained in the notification sent from the first one of the plurality of ATM communication apparatuses, with the amount of reception data counted by the reception-data-amount counting unit.

According to the second aspect of the present invention, there is provided an ATM communication system having an ATM communication network and a plurality of ATM communication apparatuses connected to the ATM communication network, where data is transmitted from a first one of the plurality of ATM communication apparatuses to a second one of the plurality of ATM communication apparatuses through a logical connection set in the ATM communication network. The first one of the plurality of ATM communication apparatuses contains a first predetermined-amount storing unit which stores information indicating a predetermined amount, a transmission-data-amount counting unit which counts an amount of transmission data which have been transmitted to the logical connection, and a notification processing unit which sends to the second one of the plurality of ATM communication apparatuses a notification that transmission data corresponding to the predetermined amount have been transmitted, when the amount of transmission data counted by the transmission-data-amount counting unit after a previous notification reaches the predetermined amount. The second one of the plurality of ATM communication apparatuses contains a second predetermined-amount storing unit which stores the information indicating the predetermined amount, a reception-data-amount counting unit which counts an amount of reception data which have been received after reception of the previous notification from the logical connection, and a congestion-state detecting unit which detects a congestion state of the ATM communication network, based on a result of comparison between the predetermined amount and the amount of reception data counted by the reception-data-amount counting unit until the notification is received after reception of the previous notification.

According to the third aspect of the present invention, there is provided a congestion state detection method for detecting a congestion state in an ATM communication system having an ATM communication network and a plurality of ATM communication apparatuses connected to the ATM communication network, where data is transmitted from a first one of the plurality of ATM communication apparatuses to a second one of the plurality of ATM communication apparatuses through a logical connection set in the ATM communication network. The method contains the steps of (a) sending from the first one of the plurality of ATM communication apparatuses to the second one of the plurality of ATM communication apparatuses an amount of transmission data to the logical connection; and (b) detecting a congestion state of the ATM communication network by comparing the amount of transmission data sent from the first one of the plurality of ATM communication apparatuses, with an amount of reception data which have been actually received by the second one of the plurality of ATM communication apparatuses.

According to the fourth aspect of the present invention, there is provided a congestion state detection method for detecting a congestion state in an ATM communication system having an ATM communication network and a plurality of ATM communication apparatuses connected to the ATM communication network, where data is transmitted from a first one of the plurality of ATM communication apparatuses to a second one of the plurality of ATM communication apparatuses through a logical connection set in the ATM communication network. The method contains the steps of (a) storing information indicating a predetermined amount in the first and second ones of the plurality of ATM communication apparatuses; (b) sending from the first one of the plurality of ATM communication apparatuses to the second one of the plurality of ATM communication apparatuses a notification that transmission data corresponding to the predetermined amount have been transmitted, when transmission data which have been transmitted after a previous notification from the first one of the plurality of ATM communication apparatuses to the logical connection reaches the predetermined amount; and (c) detecting a congestion, state of the ATM communication network based on a result of comparison between the predetermined amount and an amount of reception data which have been received by the second one of the plurality of ATM communication apparatuses from the logical connection until the notification is received after reception of the previous notification.

According to the fifth aspect of the present invention, there is provided a transmitter-side ATM communication apparatus connected to an ATM communication network, where data is transmitted from the transmitter-side ATM communication apparatus to a receiver-side ATM communication apparatus through a logical connection set in the ATM communication network. The transmitter-side ATM communication apparatus contains a transmission-data-amount counting unit which counts an amount of transmission data to the logical connection; and a notification processing unit which sends to the receiver-side ATM communication apparatus a notification containing the amount of transmission data counted by the transmission-data-amount counting unit, so that the receiver-side ATM communication apparatus can detect a congestion state of the ATM communication network by comparing the amount of transmission data with an amount of reception data which have been actually received by the receiver-side ATM communication apparatus.

According to the sixth aspect of the present invention, there is provided a transmitter-side ATM communication apparatus connected to an ATM communication network, where data is transmitted from the transmitter-side ATM communication apparatus to a receiver-side ATM communication apparatus through a logical connection set in the ATM communication network. The transmitter-side ATM communication apparatus contains a predetermined-amount storing unit which stores information indicating a predetermined amount; a transmission-data-amount counting unit which counts an amount of transmission data which have been transmitted to the logical connection; and a notification processing unit which sends to the receiver-side ATM communication apparatus a notification that transmission data corresponding to the predetermined amount have been transmitted, when transmission data corresponding to the predetermined amount have been transmitted to the logical connection after a previous notification, so that the receiver-side ATM communication apparatus can determine whether or not the ATM communication network is in a congestion state by comparing the predetermined amount with an amount of reception data which have been received from the logical connection until the notification sent by notification processing unit is received by the receiver-side ATM communication apparatus after the previous notification.

According to the seventh aspect of the present invention, there is provided a receiver-side ATM communication apparatus connected to an ATM communication network, where data is transmitted from a transmitter-side ATM communication apparatus to the receiver-side ATM communication apparatus through a logical connection set in the ATM communication network. The receiver-side ATM communication apparatus contains a reception-data-amount counting unit which counts an amount of reception data which have been received from the logical connection; and a congestion-state detecting unit which can detect a congestion state of the ATM communication network by comparing an amount of transmission data which have been transmitted from the transmitter-side ATM communication apparatus to the logical connection, with the amount of reception data counted by the reception-data-amount counting unit when the amount of transmission data is informed by the transmitter-side end-system.

According to the eighth aspect of the present invention, there is provided a receiver-side ATM communication apparatus connected to an ATM communication network, where data is transmitted from a transmitter-side ATM communication apparatus to the receiver-side ATM communication apparatus through a logical connection set in the ATM communication network. The receiver-side ATM communication apparatus contains a predetermined-amount storing unit which stores information indicating a predetermined amount, which is also stored in the transmitter-side ATM communication apparatus; a reception-data-amount counting unit which counts an amount of reception data which have been received from the logical connection; and a congestion-state detecting unit which can detect a congestion state of the ATM communication network, based on a result of comparison between the predetermined amount and the amount of reception data which have been received from the logical connection until a notification is received, from the transmitter-side endsystem after a previous notification, where the notification indicates that transmission data corresponding to the predetermined amount have been transmitted from the transmitter-side ATM communication apparatus to the logical, connection after a previous notification.

As described above, in the ATM communication system according to the first aspect of the present invention and by the congestion state detection method according to the third aspect of the present invention, the transmitter-side ATM communication apparatus sends to the receiver-side ATM communication apparatus an amount of transmission data which have been transmitted from the transmitter-side ATM communication apparatus to the logical connection. Receiving the amount of transmission data, the receiver-side ATM communication apparatus compares the amount of transmission data with an amount of reception data which have been actually received by the receiver-side ATM communication apparatus. Therefore, the receiver-side ATM communication apparatus can determine whether or not the ATM communication network is in a congestion state. That is, even when the ATM communication network does not have the function of notifying an endsystem of occurrence of congestion, the congestion state of the ATM communication network can be detected by the functions which are provided in the ATM communication apparatuses only, without modifying or adding a function to the ATM communication network.

The fifth aspect of the present invention provides the transmitter-side ATM communication apparatus in the above ATM communication system according to the first aspect of the present invention, and the seventh aspect of the present invention provides the receiver-side ATM communication apparatus in the above ATM communication system according to the first aspect of the present invention.

Also, as described above, in the ATM communication system according to the second aspect of the present invention and by the congestion state detection method according to the fourth aspect of the present invention, the information indicating a predetermined amount is stored in advance in both the transmitter-side and receiver-side ATM communication apparatuses. Every time transmission data corresponding to the predetermined amount have been transmitted to the logical connection, the transmitter-side ATM communication apparatus notifies the receiver-side ATM communication apparatus that transmission data corresponding to the predetermined amount have been transmitted from the transmitter-side ATM communication apparatus. Receiving the notification, the receiver-side ATM communication apparatus compares the predetermined amount with an amount of reception data which have been actually received by the receiver-side ATM communication apparatus from the logical connection until the notification is received after the previous notification. Thus, the receiver-side ATM communication apparatus can determine whether or not the ATM communication network is in a congestion state, based on the comparison result. In this case, only the above notification and transmission data are required to be sent from the transmitter-side ATM communication apparatus to the receiver-side ATM communication apparatus. Therefore, congestion can be detected with a smaller amount of overhead.

The sixth aspect of the present invention provides the transmitter-side ATM communication apparatus in the above ATM communication system according to the second aspect of the present invention, and the eighth aspect of the present invention provides the receiver-side ATM communication apparatus in the above ATM communication system according to the second aspect of the present invention.

DESCRIPTION OF THE PREFERRED EMBODIMENTS

I. Explanation of First to Eighth Aspects of Invention

The various aspects of the present invention are explained below with reference to drawings.

Figure 1A:
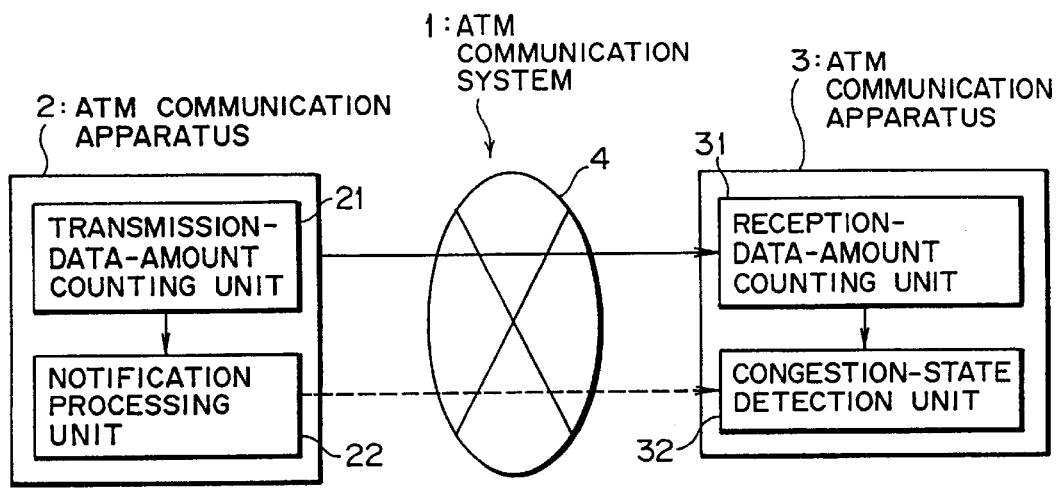
FIG. 1A is a block diagram illustrating the basic construction of the ATM communication system according to the first aspect of the present invention, which contains the transmitter-side ATM communication apparatus according to the fifth aspect of the present invention and the receiver-side ATM communication apparatus according to the seventh aspect of the present invention.

FIG. 1A is a block diagram illustrating the basic construction of the ATM communication system according to the first aspect of the present invention. In FIG. 1A, the ATM communication system 1 contains an ATM communication network 4, and ATM communication apparatuses 2 and 3 which communicate to each other through a logical connection set in the ATM communication network 4. The ATM communication network 4 does not have a function of notifying an endsystem of occurrence of congestion, and more than two ATM communication apparatuses may be connected to the ATM communication network 4. As illustrated in FIG. 1A, the transmitter-side ATM communication apparatus 2 contains a transmission-data-amount counting unit 21 and a notification processing unit 22, and the receiver-side ATM communication apparatus 3 contains a reception-data-amount counting unit 31 and a congestion-state detection unit 32.

In the ATM communication apparatus 2, the transmission-data-amount counting unit 21 counts an amount of transmission data entering the logical connection, and the notification processing unit 22 sends to the receiver-side ATM communication apparatus 3 the amount of transmission data counted by the transmission-data-amount counting unit 21. On the other hand, in the receiver-side ATM communication apparatus 3, the reception-data-amount counting unit 31 counts an amount of reception data, i.e., data which have been actually received from the logical connection. The congestion-state detection unit 32 compares the amount of transmission data entering the logical connection, with the amount of reception data, where the amount of transmission data is sent from the transmitter-side ATM communication apparatus 2, and the amount of reception data is counted by the reception-data-amount counting unit 31, as described above. Based on the comparison, the congestion-state detection unit 32 can detect the congestion atate of the ATM communication network 4.

As described above, in the above ATM communication system 1, the amount of transmission data entering a logical connection in the ATM communication network 4 is sent by the notification processing unit 22 from the transmitter-side ATM communication apparatus 2 to the receiver-side ATM communication apparatus 3. The receiver-side ATM communication apparatus 3 can detect the congestion state of the ATM communication network 4 by (using the congestion-state detection unit 32) comparing the amount of transmission data with the amount of reception data (counted by the reception-data-amount counting unit 31) which has been actually received from the above logical connection by the receiver-side ATM communication apparatus 3.

As described above, in the ATM communication system according to the first aspect of the present invention, the amount of transmission data entering the logical connection in the ATM communication network 4 is sent to the receiver-side ATM communication apparatus 3. Thus, the receiver-side ATM communication apparatus 3 can detect the congestion state of the ATM communication network 4 by comparing the amount of transmission data with the amount of data which have been actually received by the receiver-side ATM communication apparatus 3. Therefore, even when the ATM communication network does not have the function of notifying an endsystem of occurrence of congestion, the ATM communication apparatuses 2 and 3 can detect by themselves the congestion state of the ATM communication network 4 without modifying or adding a function to the ATM communication network 4.

As understood from the above explanation, the congestion state detection method according to the third aspect of the present invention is performed as the operations of the constituents of the ATM communication system according to the first aspect of the present invention, and the ATM communication system contains the ATM communication apparatuses according to the fifth and seventh aspects of the present invention.

Figure 1B:
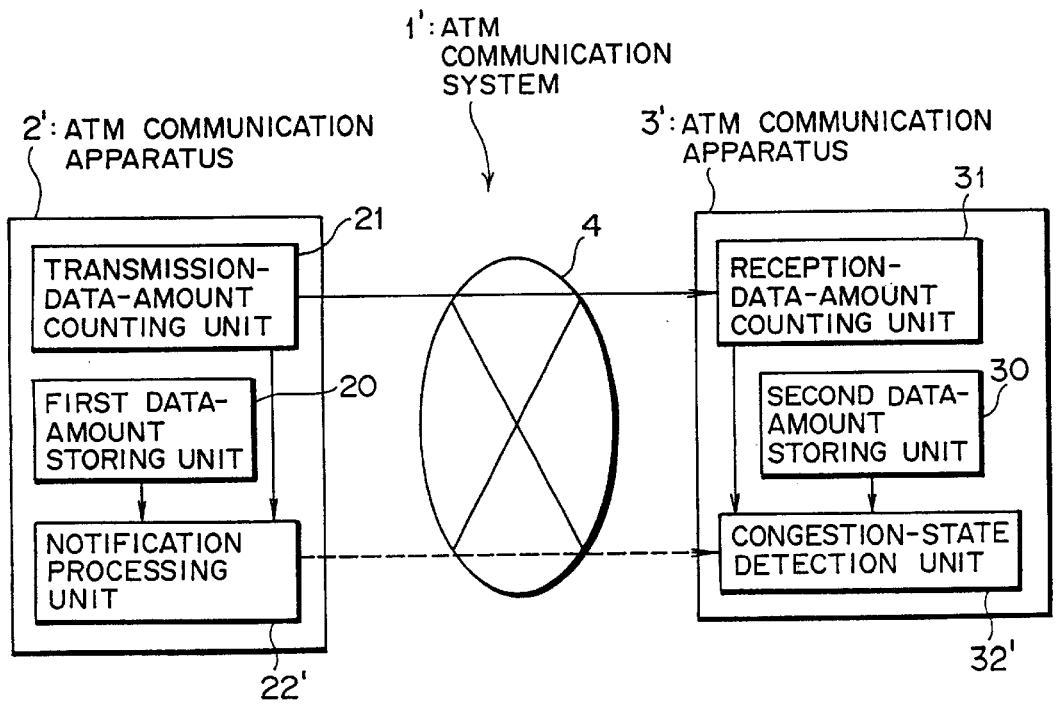
FIG. 1B is a block diagram illustrating the basic construction of the ATM communication system according to the second aspect of the present invention, which contains the transmitter-side ATM communication apparatus according to the sixth aspect of the present invention and the receiver-side ATM communication apparatus according to the eighth aspect of the present invention.

Next, FIG. 1B is a block diagram illustrating the basic construction of the ATM communication system according to the second aspect of the present invention. In FIG. 1B, the ATM communication system 1' contains the ATM communication network 4, and ATM communication apparatuses 2', 3' which communicate to each other through a logical connection set in the ATM communication network 4. As illustrated in FIG. 1B, the transmitter-side ATM communication apparatus 2' contains a first predetermined-amount storing unit 20 and a notification processing unit 22' in addition to the transmission-data-amount counting unit 21. The receiver-side ATM communication apparatus 3' contains a second predetermined-amount storing unit 30 and a congestion-state detection unit 32' in addition to the reception-data-amount counting unit 31.

In the ATM communication apparatus 2', a predetermined amount is stored in advance in the first predetermined-amount storing unit 20. The transmission-data-amount counting unit 21 counts an amount of transmission data entering the logical connection in the same manner as the first aspect of the present invention. The notification processing unit 22' sends to the receiver side ATM communication apparatus 3' a notification that data corresponding to the above predetermined amount have been transmitted to the logical connection, every time the amount of transmission data counted by the transmission-data-amount counting unit 21 reaches the predetermined amount after the previous notification.

In the ATM communication apparatus 3', the above predetermined amount is also stored in advance in the second predetermined-amount storing unit 30. The reception-data-amount counting unit 31 counts an amount of data which have been actually received from the logical connection.

The congestion-state detection unit 32' compares the above predetermined amount stored in the second predetermined-amount storing unit 30, with the amount of reception data which is counted by the reception-data-amount counting unit 31 until the above notification is sent from the notification processing unit 22' in the transmitter-side ATM communication apparatus 2' after reception of the preceding notification. Based on the comparison result, the congestion-state detection unit 32' can detect the congestion state of the ATM communication network 4.

Also, as described above, in the ATM communication system 1' according to the second aspect of the present invention, the predetermined amount is stored in advance in both the transmitter-side and receiver-side ATM communication apparatuses. Every time data corresponding to the above predetermined amount have been transmitted to the logical connection, the transmitter-side ATM communication apparatus 2' notifies the receiver-side ATM communication apparatus 3' that transmission data corresponding to the predetermined amount have been transmitted from the transmitter-side ATM communication apparatus 2'. Receiving the notification, the receiver-side ATM communication apparatus 3' compares the predetermined amount with an amount of reception data which have been actually received by the receiver-side ATM communication apparatus from the logical connection until the notification is received after reception of the previous notification. Thus, the receiver-side ATM communication apparatus 3' can determine whether or not the ATM communication network is in a congestion state, based on the comparison result.

Therefore, even when the ATM communication network does not have the function of notifying an endsystem of occurrence of congestion, the ATM communication apparatuses 2' and 3' can detect by themselves the congestion state of the ATM communication network 4 without modifying or adding a function to the ATM communication network 4.

In this case, only the above notification and transmission data are required to be sent from the transmitter-side ATM communication apparatus 2' to the receiver-side ATM communication apparatus 3'. Therefore, congestion can be detected with a smaller amount of overhead.

As understood from the above explanation, the congestion state detection method according to the fourth aspect of the present invention is performed as the operations of the constituents of the ATM communication system according to the second aspect of the present invention, and the ATM communication system contains the ATM communication apparatuses according to the sixth and eighth aspects of the present invention.

The above constructions of the first and second aspects of the present invention may further have the following features.

(i) In the ATM communication system of FIG. 1A, the notification processing unit 22 in the transmitter-side ATM communication apparatus 2 may contain a first notification-data generation unit which generates data representing the above notification to be sent to the receiver-side ATM communication apparatus 3, where the data representing the notification contains the above-mentioned amount of transmission data counted by the transmission-data-amount counting unit 21. In this case, the congestion-state detection unit 32 in the receiver-side ATM communication apparatus 3 may preferably contain a first transmission-data-amount recognizing unit which recognizes the above amount of transmission data contained in the above data representing the notification, a first data-amount comparing unit which compares the above amount of transmission data recognized by the first transmission-data-amount recognizing unit, with the amount of reception data counted by the reception-data-amount counting unit 31, and a first congestion-state determining unit which determines that the ATM communication network 4 is in a congestion state when a result of the comparison by the first data-amount comparing unit indicates that the above amount of transmission data is different from the above amount of reception data.

(ii) In the ATM communication system of FIG. 1B, the notification processing unit 22' in the transmitter-side ATM communication apparatus 2' may preferably contain a second data-amount comparing unit which compares the amount of transmission data counted by the transmission-data-amount counting unit 21, with the predetermined amount stored in the predetermined-amount storing unit 20. The transmitter-side ATM communication apparatus 2' may also contain a second notification-data generation unit which generates data representing the above notification to be sent to the receiver-side ATM communication apparatus 3', where the data representing the notification contains the above notification that transmission data corresponding to the predetermined amount have been transmitted to the logical connection after the previous notification. The generation by the second notification-data generation unit may be preferably performed when the comparison result of the second data-amount comparing unit indicates that transmission data corresponding to the predetermined amount have been transmitted to the logical connection. In this case, the congestion-state detection unit 32' in the receiver-side ATM communication apparatus 3' may preferably contain a third data-amount comparing unit which compares the above predetermined amount stored in the second predetermined-amount storing unit 30, with the amount of reception data counted by the reception-data-amount counting unit 31, and a second congestion-state determining unit which determines that the ATM communication network 4 is in a congestion state when a result of the comparison by the third data-amount comparing unit indicates that the above amount of reception data is different from the above predetermined amount.

(iii) In addition, when the above logical connection in the construction of FIG. 1B is set by using a public communication network, the transmitter-side ATM communication apparatus 2' may contain a first signaling control unit which attaches information indicating the above predetermined amount which is stored in the first predetermined-amount storing unit 20, to a signaling message which is transmitted from the transmitter-side endsystem to the ATM communication network 4 for setting the logical connection in the public communication network. Also, the receiver-side ATM communication apparatus 3' may contain a second signaling control unit which receives the above signaling message from the transmitter-side ATM communication apparatus 2', and stores the above information indicating the above predetermined amount, in the second predetermined-amount storing unit 30 in the receiver-side ATM communication apparatus 3'.

By the above first and second signaling control units, the above information on the predetermined amount can be stored in the receiver-side endsystem by using the signaling message which is transmitted between the transmitter-side and receiver-side ATM communication apparatuses when setting the logical connection therebetween.

In addition, since the above information on the predetermined amount is automatically stored at the same time as the operation of setting the logical connection, the above provision of the first and second signaling control units facilitates maintenance.

(iv) Further, the receiver-side ATM communication apparatus 3 or 3' may contain a congestion-state notification unit which notifies the transmitter-side ATM communication apparatus 2 or 2' of a congestion state when the congestion state is detected by the congestion-state detection unit 32 or 32'. In this case, the transmitter-side ATM communication apparatus 2 or 2' may contain a transmission-data-amount control unit which controls a transmission rate of data entering the logical connection to be reduced when the transmitter-side ATM communication apparatus 2 or 2' is notified of the congestion state by the congestion-state notification unit in the receiver-side ATM communication apparatus 3 or 3'.

In the case wherein the receiver-side ATM communication apparatus 3 or 3' contains the congestion-state notification unit and the transmitter-side ATM communication apparatus 2 or 2' contains the transmission-data-amount control unit, the ATM communication system 1 or 1' operates as follows.

When the receiver-side ATM communication apparatus 3 or 3' detects the congestion state, the transmitter-side ATM communication apparatus 2 or 2' is notified of the congestion state. In response to the notification of the congestion state, the transmitter-side ATM communication apparatus 2 or 2' reduces the transmission rate of at least the data transmitted to the logical connection. That is, the transmitter-side ATM communication apparatus 2 or 2' can recognize the congestion state of the ATM communication network 4, and relieve the congestion by reduction of the data transmission rate.

(v) In the above case, the notification unit 22 in the construction of FIG. 1A may contain a notification-interval control unit which controls intervals of notifications of the amount of transmission data for each logical connection. Thereby, timing of notification of the amount of transmission data for each logical connection can be shifted from timing of notifications for other logical connections, and thus timing of detection of congestion state for each logical connection can be shifted from timing of detection of congestion state for other logical connections in the receiver-side ATM communication apparatus 3 or 3'. Thus, timing of reduction control of transmission rate for each logical connection can also be shifted from timing of reduction control of transmission rate for other logical connections in the transmitter-side ATM communication apparatus 2 or 2'. Consequently, the duty factors of resources in the ATM communication network are equalized, and the resources in the network can be efficiently utilized.

(vi) In addition, the above notification-interval control unit may further control the intervals of the notifications so as to lengthen the intervals of the notifications when the transmitter-side ATM communication apparatus 2 or 2' is notified of a congestion state. By this operation, it is possible to reduce the processing load due to the notification, and it is possible to suppress worsening of the congestion state of the ATM communication network 4. Therefore, reliability of communication between the ATM communication apparatuses can be further improved.

(vii) Further, the transmitter-side ATM communication apparatus 2 or 2' may contain a priority-nonpriority recognition unit which recognizes priority or nonpriority of transmission data for a logical connection based on attributes of the transmission data. In this case, the above transmission-data-amount control unit may be constructed so as to place high priority on the reduction of the transmission rate of the transmission data whose nonpriority is recognized by the priority-nonpriority recognition unit. Thereby, transmission of data whose priority is recognized by the priority-nonpriority recognition unit can be guaranteed with high reliability. Thus, it is possible to provide high-quality communication service even when communication is performed through the ATM communication network 4 which does not have a function of notifying an endsystem of a congestion state.

(viii) Incidentally, the aforementioned first and second notification-data generation unit may be constructed so as to generate as the aforementioned data representing the notification an RM cell or a loopback (LB) cell, which is a kind of OAM cell. Thereby, it is possible to easily detect a congestion state of the ATM communication network 4 while maintaining affinity for and compatibility with the legacy ATM communication network 4.

In addition the aforementioned congestion state notification unit in the receiver-side ATM communication apparatus 3 or 3' may contain a recovery notification unit which sends a recovery notification to the transmitter-side ATM communication apparatus 2 or 2' when a congestion state detected by the congestion-state detection unit 32 or 32' has changed to a noncongestion state, i.e., when the ATM communication network 4 has recovered from the congestion state. Thereby, the transmitter-side ATM communication apparatus 2 or 2' can recognize the recovery of the ATM communication network 4 from the congestion state, and perform processing in response to the recovery.

In the above case, the transmission-data-rate control unit in the transmitter-side ATM communication apparatus 2 or 2' maybe constructed sodas to increase the transmission rate of at least the data transmitted to the logical connection when the above recovery notification is received from the receiver-side ATM communication apparatus 3 or 3'. Thereby, the transmission rate of data can be increased when the ATM communication network 4 has recovered from the congestion state, and thus the resources of the ATM communication network 4 can be efficiently utilized.

(x) Otherwise, when the receiver-side ATM communication apparatus 3 or 3' does not contain the above recovery notification unit, i.e., when the receiver-side ATM communication apparatus 3 or 3' is constructed so as not to send the above recovery notification, the above transmission-data-rate control unit may be constructed so as to increase the transmission rate of at least the data entering the logical connection when a predetermined time has elapsed without receiving the notification of a congestion state after reception of a notification of a congestion state for the logical connection. That is, the above transmission-data-rate control unit assumes that the ATM communication network 4 has recovered before the elapse of the predetermined time after reception of a notification of a congestion state, and therefore increases the transmission rate of data entering the ATM communication network 4. Thus, the resources of the ATM communication network 4 can be efficiently utilized.

In either of the above cases, it is preferable to construct the above transmission-data-rate control unit so as to increase the above transmission rate of data entering the logical connection step by step to a transmission rate before the reception of the notification of the congestion state. Thereby, it is possible to reduce a probability that the ATM communication network 4 goes back to the congestion state due to the control causing sudden increase of the transmission rate of data entering the ATM communication network 4. Therefore, it is possible to maintain reliability of communication between ATM communication apparatuses 2 and 3 while efficiently utilizing resources of the ATM communication network.

(xi) The above congestion state detection unit 32 or 32' may contain a self-congestion-state detection unit which detects a congestion state of the receiver-side ATM communication apparatus 3 or 3' per se. In this case, the above congestion-state notification unit in the receiver-side ATM communication apparatus 3 or 3' may contain a self-congestion-state notification unit which notifies the transmitter-side ATM communication apparatus 2 or 2' of the congestion state of the receiver-side ATM communication apparatus 3 or 3' per se, when the self-congestion-state detection unit detects the congestion state of the receiver-side ATM communication apparatus 3 or 3'. Thereby, the receiver-side ATM communication apparatus 3 or 3' can notify the transmitter-side ATM communication apparatus 2 or 2' of the congestion state of the receiver-side ATM communication apparatus 3 or 3', and the transmitter-side ATM communication apparatus 2 or 2' can perform operations according to the notification.

In the above case, the above transmission-data-rate control unit may be constructed so as to also reduce the transmission rate to the logical connection when the transmitter-side ATM communication apparatus 2 or 2' is notified of the congestion state of the receiver-side ATM communication apparatus 3 or 3' per se. Thereby, it is possible to relieve the congestion state of the receiver-side ATM communication apparatus 3 or 3' per se, in addition to the congestion state of the ATM communication network 4. Thus, reliability of communication between ATM communication apparatuses 2 and 3 can be further improved.

(xii) In addition, the above congestion-state notification unit in the receiver-side ATM communication apparatus 3 or 3' may contain a notification-data transformation unit which transforms data representing the above notification sent from the transmitter-side ATM communication apparatus 2 or 2', into a form suitable for the notification of the congestion state to the transmitter-side ATM communication apparatus 2 or 2'. Thereby, it is not necessary for the congestion-state notification unit to generate data representing the notification of the congestion state from beginning. Instead, the congestion-state notification unit can utilize the data representing the notification sent from the transmitter-side ATM communication apparatus 2 or 2', for notifying the transmitter-side ATM communication apparatus 2 or 2' of the congestion state. Thus, the processing load on the receiver-side ATM communication apparatus 3 or 3' can be reduced.

The above notification-data transformation unit may be constructed so as to perform the above transformation only when the congestion state is detected. Thereby, the data representing the notification is transmitted to the transmitter-side ATM communication apparatus 2 or 2' only when the congestion state is detected. Therefore, traffic in the ATM communication network 4 and processing load on the transmitter-side and receiver-side ATM communication apparatuses 2, 2', 3, and 3' can be reduced, the resources in the ATM communication network can be efficiently utilized, and throughput of the transmitter-side and receiver-side ATM communication apparatuses 2, 2', 3, and 3' can be improved.

(xiii) When the data representing the notification sent from the transmitter-side ATM communication apparatus 2 or 2' is contained in an RM cell or a loopback (LB) cell, which is a kind of OAM cell, the above notification-data transformation unit may be constructed as a cell returning unit which attaches information on the congestion state to the RM cell or the loopback cells, and returns to the transmitter-side ATM communication apparatus 2 or 2' the RM cell or the loopback cell as a cell containing the data for notification of the congestion state.

Thereby, the transmitter-side ATM communication apparatus 2 or 2' can be notified of the occurrence of the congestion state while maintaining affinity for the ATM communication network. Since the RM cell or the loopback cell are originally configured to be looped back, it is not necessary for the receiver-side ATM communication apparatus 3 or 3' to perform additional processing such as an address change. Therefore, processing load on the receiver-side ATM communication apparatus 3 or 3 ' can be reduced.

(xiv) Otherwise, when the receiver-side ATM communication apparatus 3 or 3' has user data to be transmitted to the transmitter-side ATM communication apparatus 2 or 2', the congestion-state notification unit may contain a user-data-utilizing congestion-state notification unit which notifies the transmitter-side ATM communication apparatus 2 or 2' of the congestion state by utilizing the user data to be transmitted to the transmitter-side ATM communication apparatus 2 or 2'. Thereby, it is not necessary to send an additional cell for the notification of the congestion state. Therefore, traffic in the ATM communication network can be further reduced, and the resources in the ATM communication network can be utilized more efficiently.

The embodiments of the present invention are explained below with reference to the drawings.

II. Construction of First Embodiment

Figure 2:
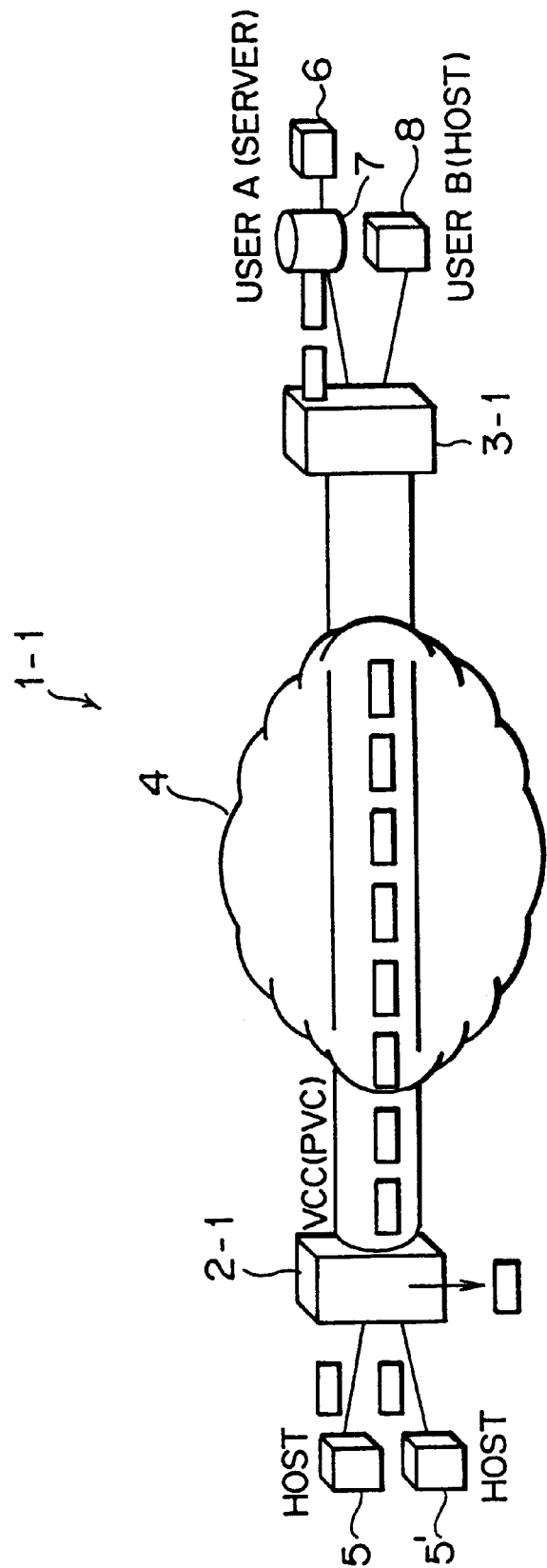
FIG. 2 is a block diagram illustrating the construction of the ATM communication system as the first embodiment of the present invention.

FIG. 2 is a block diagram illustrating the construction of the ATM communication system as the first embodiment of the present invention. The ATM communication system 1-1 contains an ATM communication network 4-1 and endsystems 2-1 and 3-1. The ATM communication network 4-1 may be, for example, a wide area network (WAN), and does not have a function of notifying an endsystem occurrence of a congestion state. The endsystems 2-1 and 3-1 in FIG. 2 are ATM routers (remote routers), to which hosts, servers, and the like are connected. Each of these hosts and servers may be a constituent of a local area network (LAN). In FIG. 2, the hosts 5, 5', and 8 and the server 7 are indicated as typical examples of the above hosts and servers. For example, an IP (Internet Protocol) packet, as user data, may be transmitted in the form of ATM cells from the host 5 through a logical connection (virtual channel connection, VCC), configured as a permanent virtual connection (PVC) in the ATM communication network 4-1, to the host 8 (of a user B) or the host 6 (of a user A) which is connected to the server 7. Although only one logical connection (VCC) is indicated in FIG. 2, actually a plurality of logical connection can be configured concurrently.

Figure 4:
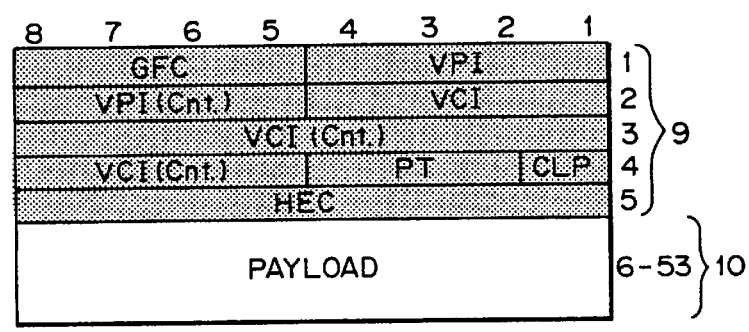
FIG. 4 is a diagram illustrating the format of the ATM cell used in the first embodiment of the present invention.

As illustrated in FIG. 4, each ATM cell is comprised of 53 bytes, and contains an ATM header 9 of five bytes (octets) and a payload 10 of 48 bytes. The user data are contained in the payload 10, and the ATM header 9 (indicated with halftone) contains a virtual path identifier (VPI) and a virtual channel identifier (VCI) as identifiers which identify the above logical connection (VCC). By appropriately setting the VPI and the VCI, the ATM cells can be transmitted to their destinations. For example, ATM cells can be transmitted between the ATM routers 2-1 and 3-1.

Figure 3:
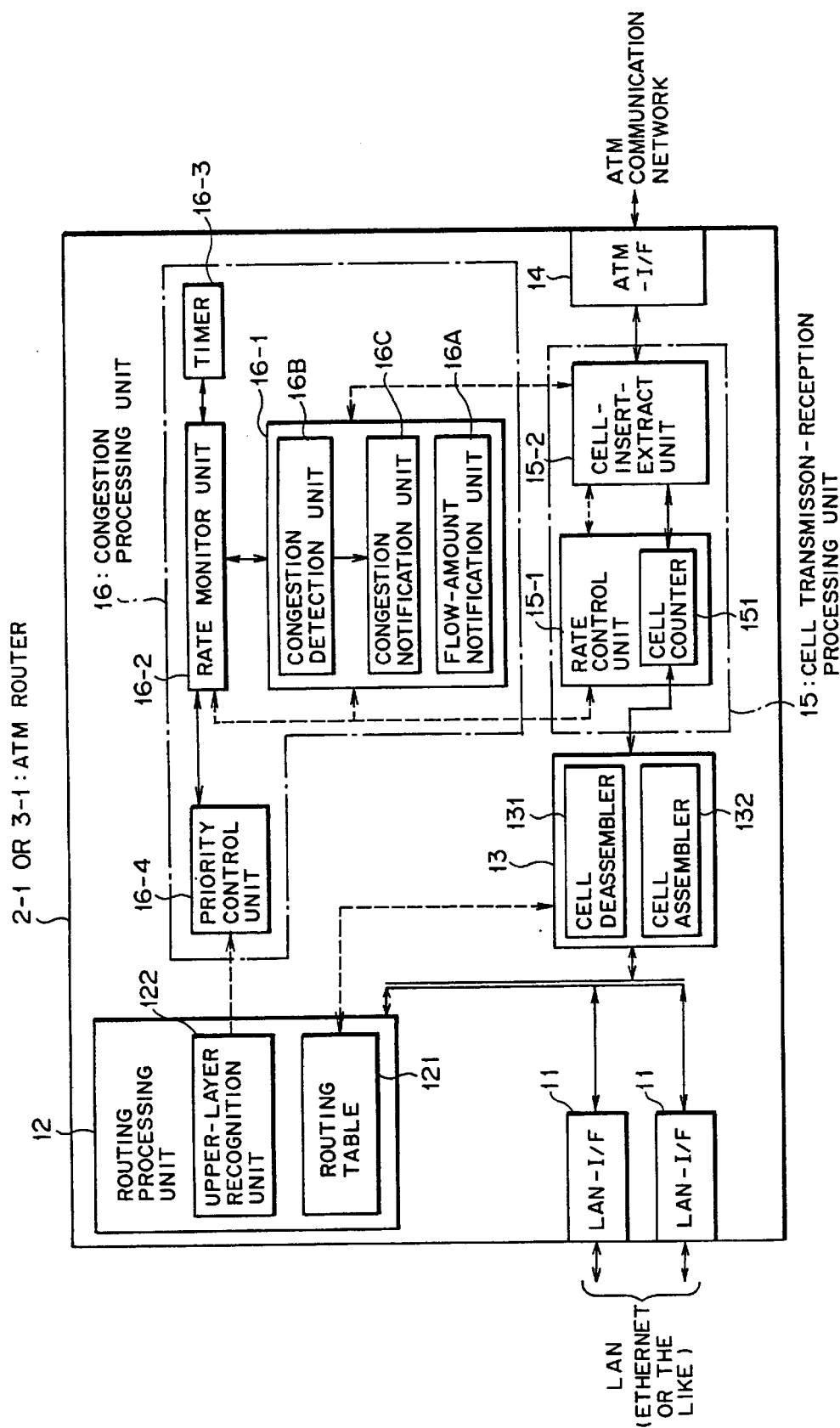
FIG. 3 is a block diagram illustrating the construction of the ATM routers in the ATM communication system illustrated in FIG. 2.

Each of the ATM routers 2-1 and 3-1 in the ATM communication system 1-1 illustrated in FIG. 2 functions as the aforementioned ATM communication apparatus, and has as fundamental elements of the ATM router a plurality of LAN interface units 11, a routing processing unit 12, a cell assembler/disassembler unit 13, an ATM interface unit 14, a cell-transmission-and-reception processing unit 15, and a congestion processing unit 16, as illustrated in FIG. 3.

The plurality of LAN interface units 11 are provided as interfaces with a plurality of LANs, respectively, where the hosts 5, 5', and 6 and the server 7 belong to one or more of the plurality of LANs. The routing processing unit 12 determines (a VPI and a VCI of) a next hop of an IP packet received, for example, from the host 5 (or the user A or B), based on an IP address of a destination (which is contained in the received IP packet) and information stored in a routing table 121. The routing processing unit 12 determines a destination IP address of a reception ATM cell, which is received from the ATM communication network 4-1, based on a VPI and a VCI of the received ATM cell and information stored in a routing table 121, where the VPI and VCI of the received ATM cell is obtained by disassembling the received ATM cell by the cell assembler/disassembler unit 13.

In the routing processing unit 12, the upper-layer recognition unit 122 recognizes attributes of the received IP packet. For example, the attributes indicate which one of upper layers such as a session layer, a presentation layer, and an application layer the user data contained in the received IP packet belongs. In this embodiment, priority control of a transmission rate of cells transmitted to the ATM communication network 4 is performed by a priority control unit 16-4 based on the recognition result obtained by the upper-layer recognition unit 122, as explained later.

The cell assembler/disassembler unit 13 disassembles ATM cells received from the ATM communication network 4 for forming an IP packet, i.e., removes the header from the received ATM cells. The cell assembler/disassembler unit 13 also forms an ATM cell to be transmitted to the ATM communication network 4 by attaching an ATM header to the user data contained in the received IP packet. For these purposes, the cell assembler/disassembler unit 13 contains a cell disassembler unit 131 and a cell assembler unit 132.

The ATM interface 14 is provided as an interface with the ATM communication network 4.

The cell-transmission-and-reception processing unit 15 transmits the above ATM cell formed by the cell assembler unit 132 in the cell assembler/disassembler unit 13 to the ATM communication network 4, and sends the ATM cell received from the ATM communication network 4 to the cell disassembler unit 131 in the cell assembler/disassembler unit 13. In this embodiment, the cell-transmission-and-reception processing unit 15 contains a rate control unit 15-1 and a cell-insert-and-extract unit 15-2, where the rate control unit 15-1 contains a cell counter 151.

The cell counter 151 in the rate control unit 15-1 functions as the aforementioned a transmission-data-amount counting unit and the aforementioned reception-data-amount counting unit according to the first, second, and fifth to eighth aspects of the present invention. When the ATM router 2-1 is a transmitter-side endsystem, the cell counter 151 counts the number of transmitted user cells for each VCC, i.e., the number of transmitted cells having the same VPI and the same VCI. That is, when the ATM router 2-1 is a transmitter-side endsystem, the cell counter 151 counts the amount of transmission data for each VCC. When the ATM router 2-1 is a receiver-side endsystem, the cell counter 151 counts the number of received user cells for each VCC, i.e., the number of received cells having the same VPI and the same VCI. That is, when the ATM router 2-1 is a receiver-side endsystem, the cell counter 151 counts the, reception data amount for each VCC. The counted result (count) of the cell counter 151 is sent to the congestion processing unit 16.

In the above operations, the cell counter 151. recognizes connection identifiers (VPI and VCI) contained in the cell header, ignores Idle dells and OAM cells in the physical layer (F1, F2, and F3), which cannot be transmitted to the ATM layer, and counts only user cells which can be transmitted through the ATM layer. It is possible to determine whether or not each cell is a user cell based on information in the payload type (PT) field in the ATM header 9.

When the ATM router 2-1 is a transmitter-side endsystem, the cell-insert-and-extract unit 15-2 is provided for inserting a flow-amount notification cell into a flow of user cells, and extracting a congestion notification cell, which is transmitted from a receiver-side endsystem as a response to the flow-amount notification cell, under control of the congestion processing unit 16 as explained later.

The rate control unit 15-1 functions as the aforementioned transmission-data-amount control unit. That is, the rate control unit 15-1 can control the transmission rate of cells to be transmitted to the ATM communication network 4 for each VCC. In this embodiment, when the ATM router 2-1 as a transmitter-side endsystem is notified of congestion (i.e., discard of a cell) in a VCC by the above congestion notification cell transmitted from the receiver-side ATM router 3-1, the rate control unit 15-1 controls the transmission rate of cells transmitted to the VCC in the ATM communication network 4 to be reduced. In addition, when the ATM router 2-1 is notified of recovery from the congestion in the VCC by a congestion notification cell which is transmitted from the receiver-side ATM router 3-1 and notifies the transmitter-side ATM router 2-1 of a normal (noncongestion) state, the rate control unit 15-1 controls the transmission rate of cells transmitted to the VCC in the ATM communication network 4 to be increased. Details of the transmission cell rate control (hereinafter referred to as rate control) are explained later.

The congestion processing unit 16 performs processing which is necessary for detecting a congestion state (i.e., discard of a cell) in the ATM communication network 4, and relieving the congestion. For these purposes, the congestion processing unit 16 contains a congestion control unit 16-1, a rate monitor unit 16-2, a timer unit 16-3, and the aforementioned priority control unit 16-4, as illustrated in FIG. 3

The congestion control unit 16-1 performs overall control of processing relating to detection of congestion in ATM communication network 4 such as generation of the above flow-amount notification cell and the congestion notification cell, the detection of congestion in the ATM communication network 4, and the rate control in response to the detection of congestion or recovery therefrom. For these purposes, in this embodiment, the congestion control unit 16-1 contains a flow-amount notification unit 16A, a congestion detection unit 16B, and a congestion notification unit 16C, as illustrated in FIG. 3.

When the ATM router 2-1 is a transmitter-side endsystem, the flow-amount notification unit 16A functions as the aforementioned notification processing unit, and notifies the receiver-side endsystem 3-1 of the number of cells transmitted to a VCC for a certain duration by using the flow-amount notification cell, where the number of transmitted cells (transmission cells) is counted by the cell counter 151.

When the ATM router 2-1 is a receiver-side endsystem, the congestion detection unit 16B functions as the aforementioned congestion-state detection unit, and can detect a congestion state of the ATM communication network 4 by comparing the number of transmission cells which have been transmitted from the transmitter-side endsystem 3-1 to a VCC, with the number of reception cells which have been received from the VCC, where the number of transmission cells is notified by the flow-amount notification cell transmitted from the transmitter-side endsystem 3-1, and the number of reception cells is counted by the cell counter 151 until the ATM router 2-1 receives the flow-amount notification cell.

The congestion notification unit 16C functions as the aforementioned congestion-state notification unit. When the congestion detection unit 16B detects a congestion state of the ATM communication network 4, the congestion notification unit 16C notifies the transmitter-side endsystem 3-1 of the detection of the congestion state by a congestion notification cell.

In this embodiment, the congestion detection unit 16B can also detect a congestion state of the ATM router 2-1 to which the congestion detection unit 16B belongs, when a buffer (e.g., a buffer for cell insert or cell extract in the cell-insert-and-extract unit 15-2) for a VCC in the ATM router 2-1 is full of data, or is being fully occupied by data. In this case, the congestion notification unit 16C also notifies the transmitter-side endsystem 3-1 of the congestion state of the ATM router 2-1 by a congestion notification cell.

Figure 5:
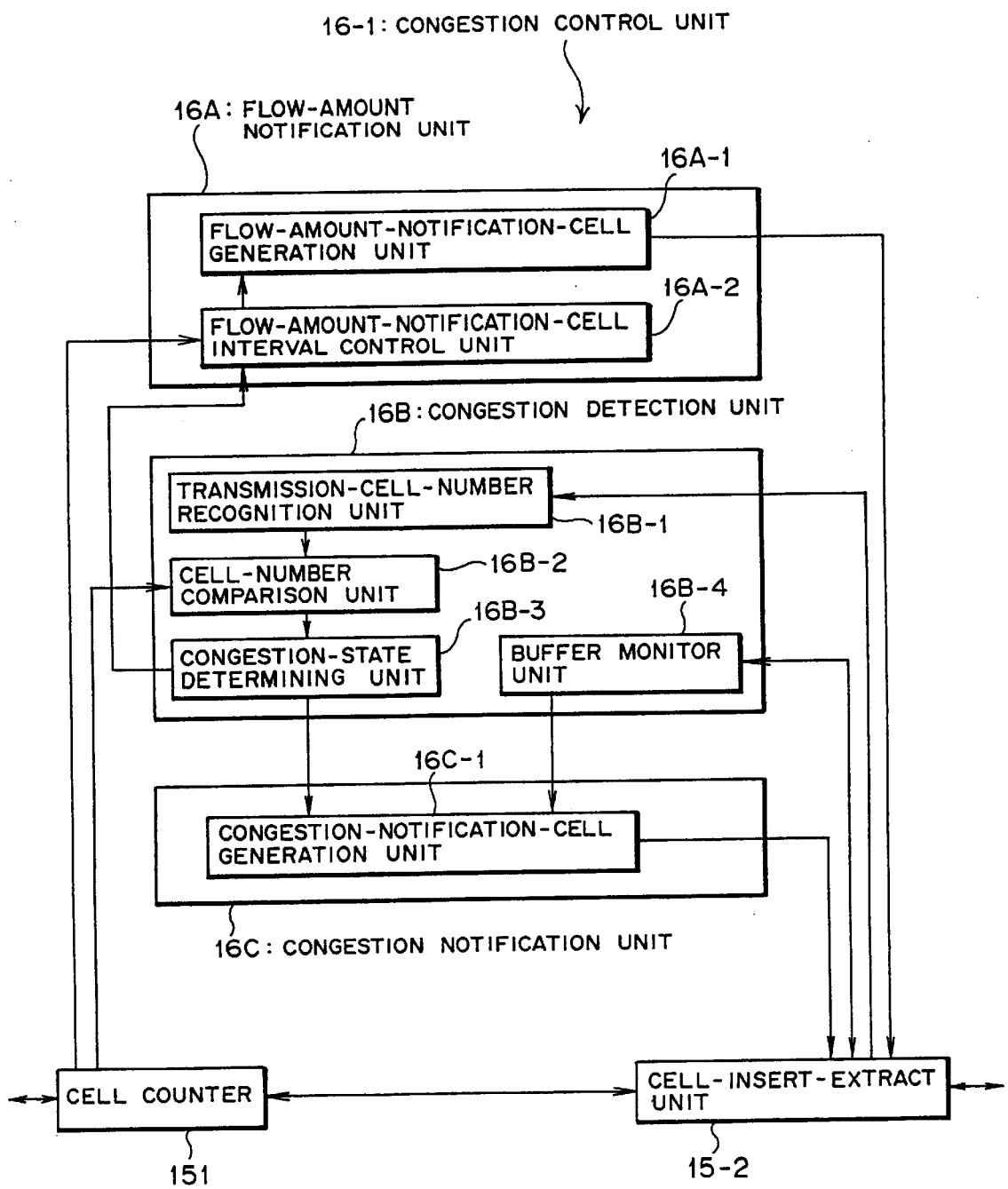
FIG. 5 is a block diagram illustrating the constructions of the flow-amount notification unit, the congestion detection unit, and the congestion notification unit in the ATM router illustrated in FIG. 3.

In order to realize the above functions, the above flow-amount notification unit 16A, the congestion detection unit 16B, and the congestion notification unit 16C may be constructed as illustrated in FIG. 5. That is, the flow-amount notification unit 16A contains a flow-amount-notification-cell generation unit 16A-1 and a flow-amount-notification-cell interval control unit 16A-2. The congestion detection unit 16B contains a transmission-cell-number recognition unit 16B-1, a cell-number comparison unit 16B-2, a congestion-state determining unit 16B-3, and a buffer monitor unit 16B-4. The congestion notification unit 16C contains a congestion-notification-cell generation unit 16C-1.

In the flow-amount notification unit 16A, the flow-amount-notification-cell interval control unit 16A-2 controls transmission intervals (periods) of the above flow-amount notification cell for each VCC, and the flow-amount-notification-cell generation unit 16A-1 generates as the above flow-amount notification cell a cell to which the count (indicating information on the number of transmission cells) of the cell counter 151 is attached, at the above transmission intervals controlled by the above flow-amount-notification-cell interval control unit 16A-2. The above flow-amount notification cell is inserted into the flow of user cells in the forward direction by the cell-insert-and-extract unit 15-2 to send the flow-amount notification cell to the receiver-side endsystem 3-1.

In this embodiment, the above flow-amount notification cell is generated in the format of the loopback (LB) cell, which is a kind of OAM cell. Details of the loopback cell are explained later.

In addition, the above transmission intervals may not necessarily be constant. When the transmission intervals are short, congestion can be detected quickly. However, processing load on the endsystems becomes heavy. Conversely, when the transmission intervals are made long, detection of congestion is delayed. However, processing load on the endsystems can be reduced.

Nevertheless, once congestion is detected, it is no longer necessary to maintain the short transmission intervals of the flow-amount notification cell. Therefore, in this embodiment, when congestion is detected, the flow-amount notification cells are transmitted at intervals longer than usual transmission intervals to reduce the processing load on the endsystems 2-1 and 3-1. The change of the transmission intervals is also made for each VCC.

In the congestion detection unit 16B, the transmission-cell-number recognition unit 16B-1 functions as the aforementioned transmission-data-amount recognizing unit, and recognizes the number of transmission cells which have been transmitted from the transmitter-side endsystem 3-1 to the VCC, from the above-mentioned information on the number of transmission cells which is attached to the above flow-amount notification cell, and the cell-number comparison unit 16B-2 compares the number of transmission cells recognized by the transmission-cell-number recognition unit 16B-1, with the number of reception cells which have been received from the above VCC, where the number of reception cells is counted by the cell counter 151.

The congestion-state determining unit 16B-3 functions as the aforementioned first congestion-state determining unit. That is, the congestion-state determining unit 16B-3 determines that the ATM communication network 4 is in a congestion state when a result of the comparison by the cell-number comparison unit 16B-2 indicates that, the above number of transmission cells is different from the above number of reception cells, and determines that the ATM communication network 4 is in a normal state when a result of the comparison by the cell-number comparison unit 16B-2 indicates that the above number of transmission cells is equal to the above number of reception cells.

The buffer monitor unit 16B-4 functions as the aforementioned self-congestion-state detection unit. That is, the buffer monitor unit 16B-4 monitors free space in the buffer in the cell-insert-and-extract unit 15-2, and determines that the ATM router 2-1 to which the congestion detection unit 16B belongs is in a congestion state when the buffer is full of data, or is being fully occupied by data.

In addition, in the congestion notification unit 16C, the congestion-notification-cell generation unit 16C-1 generates a congestion notification cell for notifying the transmitter-side endsystem 3-1 of a congestion state of the ATM communication network detected by the congestion detection unit 16B or a congestion state of the ATM router 2-1 detected by the buffer monitor unit 16B-4. The congestion notification cell is inserted into a flow of user cells in the backward direction to be sent to the transmitter-side endsystem 3-1.

In this embodiment, the above congestion notification cell is not generated separately from the flow-amount notification cell. Instead, the congestion notification cell is generated by including information which indicates a congestion state or a normal state, in a flow-amount notification cell received from the transmitter-side endsystem 3-1.

That is, the above congestion-notification-cell generation unit 16C-1 also functions as the aforementioned notification-data transformation unit which transforms a flow-amount notification cell transmitted from the transmitter-side endsystem 3-1 into a congestion notification cell (including data representing the notification of the congestion state) to be sent to the transmitter-side endsystem 3-1. Thereby, it is possible to send a notification of a congestion state by utilizing the flow-amount notification cell received from the transmitter-side endsystem 3-1, without separately generating the congestion notification cell. Therefore, processing load is reduced.

When the congestion state determining unit 16B-3 determines that the ATM communication network or the ATM router 3-1 is in a normal state after occurrence of a congestion state, the above congestion-notification-cell generation unit 16C-1 can send to the transmitter-side endsystem 3-1 a notification of recovery from a congestion state by including in the congestion notification cell information which indicates a normal state.

That is, when the buffer monitor unit detects a congestion state of the receiver-side endsystem 3-1, the congestion-notification-cell generation unit 16C-1 functions as the self-congestion notification unit which notifies the transmitter-side endsystem 3-1 of the detected congestion state. When a congestion state detected by the congestion detection unit 16B has changed to a normal state, i.e., recovery of the congestion state is detected, the congestion-notification-cell generation unit 16C-1 functions as the aforementioned recovery notification unit which sends a recovery notification to the transmitter-side endsystem 3-1.

The above transformation from the flow-amount notification cell into the congestion notification cell may be preferably performed every time the flow-amount notification cell is received. That is, the congestion notification cell may be regularly sent to the transmitter-side endsystem 3-1 for notifying a congestion or normal state of the ATM communication network and the receiver-side endsystem 2-1. However, processing load can be reduced if the notification of the congestion or normal state of the ATM communication network and the receiver-side endsystem 2-1 is sent to the transmitter-side endsystem 3-1 only when a congestion state is detected. In the latter case, resources in the ATM communication network can be efficiently used, and throughput of the endsystems 2-1 and 3-1 is improved.

In FIG. 3, the rate monitor unit 16-2 monitors the current transmission rate of cells, and the rate control unit 15-1 performs rate control based on a result of the monitoring operation so that the transmission cell rate becomes a desired rate.

When the ATM router 2-1 is the transmitter-side endsystem, the timer unit 16-3 counts a plurality of predetermined times respectively elapsed after a congestion notification cell indicating notification of the congestion is received from the receiver-side endsystem 3-1. The timer unit 16-3 operates in the case wherein the congestion notification cell is sent from the receiver-side endsystem 3-1 to the transmitter-side endsystem 2-1 only when the congestion state is detected. In this embodiment, the timer unit 16-3 contains three timers respectively counting times T1; T2, and T3. For example, the times T1, T2, and T3 are within a range from a few minutes to several tens of minutes.

Although the above predetermined times T1, T2, and T3 may be identical, these times T1, T2, and T3 may be otherwise different from each other. In the latter case, the rate control unit 15-1 can increase the transmission cell rate step by step by using the above predetermined. times T1, T2, and T3 as triggers, as explained later.

The priority control unit 16-4 recognizes priority or nonpriority of user cells (as transmission data on a VCC) based on the attributes recognized by the upper-layer recognition unit 122, and controls the operation of the rate control unit 15-1 based on the recognition result. For example, the rate control unit 15-1 places high priority on an operation of reducing a transmission cell rate of the user cells of which nonpriority is recognized by the priority control unit 16-4.

The above flow-amount notification cell and the congestion notification cell may be generated in an arbitrary format defined by a user. However, in this embodiment, the format of OAM cell (LB cell) is used for maintaining affinity for the legacy ATM communication network 4.

Figure 6:
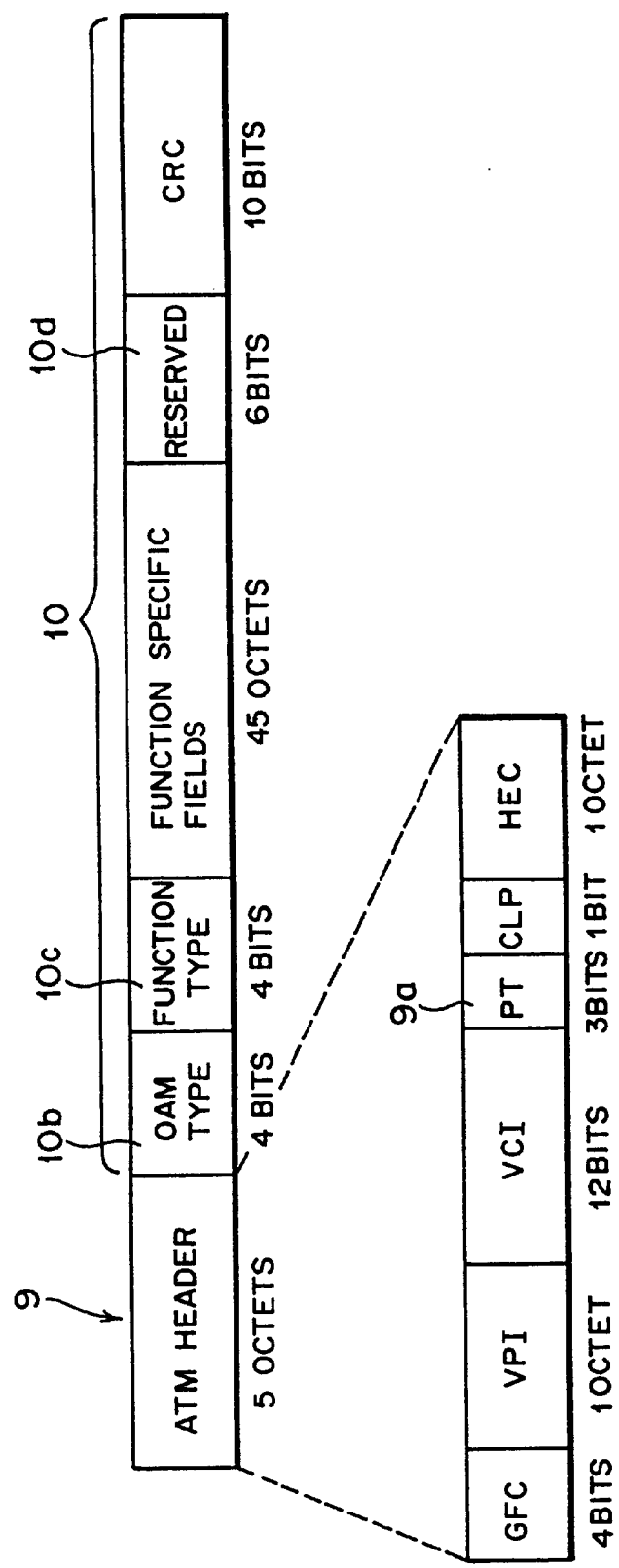
FIG. 6 is a diagram illustrating the format of the OAM cell used in the first embodiment of the present invention.

The LB cell is called End-to-End F5 cell, and is provided for sending information on failure end to end in the VC layer. The LB cell has the format as illustrated in FIG. 6. "101" is written in the PT field 9a for indicating that the cell of the format of FIG. 6 is an End-to-End F5 OAM cell, and "0.001" and "1000" are written in the OAM-type field 10b and the function-type field 10c, respectively, for indicating that the cell of FIG. 6 is an LB cell.

End systems can arbitrarily insert an LB cell into a flow of user cells. The LB cell is usually used by a transmitter-side endsystem for transmitting it to a receiver-side endsystem and determining whether or not the LB cell is normally looped back.

Therefore, when the flow-amount-notification-cell generation unit 16A-1 in the flow-amount notification unit 16A in the transmitter-side endsystem 2-1 writes in (attaches to) the LB cell the above-mentioned information on the number of transmission cells, and the congestion-state-notification-cell generation unit 16C-1 in the congestion-state notification unit 16C in the receiver-side endsystem 3-1 writes in the LB cell the result of the operation of the congestion detection unit 16B, it is possible to perform the flow-amount notification and the congestion notification by using one cell. Although the above information on the number of transmission cells may be written in any location in the payload 10, it is possible to use the reserved field 10d for maintaining the format of OAM cell.

As described above, in this embodiment, the flow-amount-notification-cell generation unit 16A-1 in the transmitter-side endsystem 2-1 generates as the flow-amount notification cell an LB cell, which is a kind of OAM cell, and the congestion-state-notification-cell generation unit 16C-1 in the receiver-side endsystem 3-1 attaches to the above LB cell the information for congestion notification (indicating a congestion state or a normal state) and returns the LB cell as the congestion notification cell to the transmitter-side endsystem 2-1. That is, the congestion-state-notification-cell generation unit 16C-1 in the receiver-side endsystem 3-1 functions as the aforementioned cell returning unit.

When each of the endsystems 2-1 and 3-1 has the function corresponding to the ABR service, it is possible to use the RM cell. Therefore, in this case, the resource management (RM) cell can be used for the flow-amount notification cell and the congestion notification cell, in the same manner as the LB cell.

Figure 7:
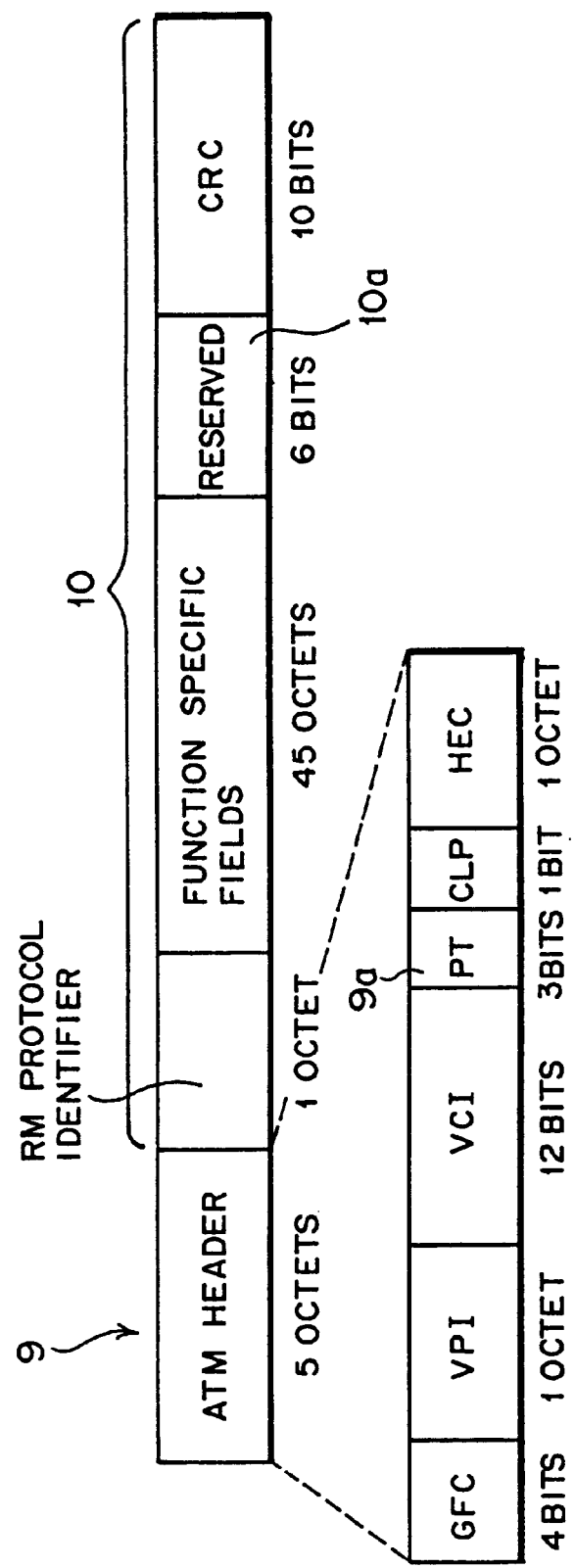
FIG. 7 is a diagram illustrating the format of the RM cell used in the first embodiment of the present invention.

The RM cell is originally defined for sending to a transmitter-side endsystem a notification of a congestion state in a network having the function of the ABR service or in a receiver-side endsystem, and has the format, for example, as illustrated in FIG. 7. Values common to all user cells transmitted through the same VCC are written in the fields for the logical connection identifiers (VPI and VCI) in the ATM header 9. "110" is written in the PT field 9a (of three bits) for indicating that the cell of FIG. 7 is an RM cell.

The endsystems having provisions corresponding to the ABR service can perform the following operations by using the RM cell.

(i) The transmitter-side endsystem regularly generates, an RM cell and transmits the RM cell toward a receiver-side endsystem.

(ii) When congestion occurs or is about to occur in a network (actually, in an ATM exchange having provisions for the ABR service, or the like in the network), the network writes information indicating the occurrence of the congestion in the RM cell received from the transmitter-side endsystem, and transfers the RM cell in the forward direction. Instead of the above information indicating the occurrence of the congestion, a transmission cell rate which is specified for the transmitter-side endsystem may be written in the RM cell. Otherwise, the network generates a new RM cell containing the above information, and sends the RM cell in the backward direction.

(iii) The receiver-side endsystem receives the RM cell, and writes in the RM cell information indicating a congestion state of the receiver-side endsystem, and transmits the RM cell in the backward direction.

(iv) When the transmitter-side endsystem recognizes that congestion occurs in the network or the receiver-side endsystem by receiving the RM cell, the transmitter-side endsystem reduces the cell transmission rate to relieve the congestion.

The RM cell transmitted from the transmitter-side endsystem can be looped back at the receiver-side endsystem when the RM cell is configured appropriately. In addition, since the RM cell contains the same logical connection identifiers (VPI and VCI) as the user cells, the RM cell is transparently treated by the ATM exchange or the like in the network, in the same manner as the user cells even when the RM cell is transmitted through the ATM network 4 which provides only the UBR and VBR services and does not provide the ABR service, i.e., even when the ATM network 4 does not have the function of notification of congestion.

Therefore, similar to the case wherein the LB cell is used, when the flow-amount-notification-cell generation unit 16A-1 in the flow-amount notification unit 16A in the transmitter-side endsystem 2-1 writes in (attaches to) an RM cell the above-mentioned information on the number of transmission cells, and the congestion-state-notification-cell generation unit 16C-1 in the congestion-state notification unit 16C in the receiver-side endsystem 3-1 writes in the RM cell the result of the operation of the congestion detection unit 16B, it is possible to perform the flow-amount notification and the congestion notification by using one RM cell.

Although the above information on the number of transmission cells or congestion notification may be written in any location in the payload 10 (in FIG. 4) of the RM cell, it is possible to use the reserved field 10a as illustrated in FIG. 7, (of six bits) for maintaining the format of OAM cell.

As explained above, when the OAM (LB) cell or the RM cell is used for the flow-amount notification and the congestion notification, it is not necessary for (the congestion-state-notification-cell generation unit 16C-1 in) the receiver-side endsystem 3-1 to perform. specific control operations such as an operation for changing destination information (VPI and VCI), and therefore processing load on the receiver-side endsystem 3-1 is reduced, since either of the LB cell and the RM cell is originally configured to be looped back at the receiver-side endsystem toward the transmitter-side endsystem 2-1.

In addition, when there is traffic in the backward direction on the same VCC, i.e., when there are user data to be transmitted from the transmitter-side endsystem 2-1 to the receiver-side endsystem 3-1, the user cell may be used as the above congestion notification cell. In this case, the congestion-state-notification-cell generation unit 16C-1 may be constructed so as to make a congestion notification bit, which is defined in the PT field in the ATM header 9 (illustrated in FIG. 4), indicate congestion.

That is, in this case, the congestion-state-notification-cell generation unit 16C-1 functions as the aforementioned user-data-utilizing congestion-state notification unit, and sends a notification of congestion from the receiver-side endsystem 3-1 to the transmitter-side endsystem 2-1 by using user data. Thereby, it is not necessary to generate and transmit a separate cell as the congestion notification cell. Therefore, traffic in the ATM communication network 4 is further reduced, and resources in the ATM communication network 4 can be utilized more efficiently.

III. Operations of First Embodiment

Details of the operations of the ATM communication system 1-1 (including the ATM routers 2-1 and 3-1) as the first embodiment of the present invention are explained below. Although, for the purpose of explanation, it is assumed that the ATM router 2-1 is the transmitter-side endsystem and the ATM router 3-1 is the receiver-side endsystem, the same operations are performed when the transmitter-side endsystem and the receiver-side endsystem are exchanged.

(1) FIRST EXAMPLE

Figure 12:
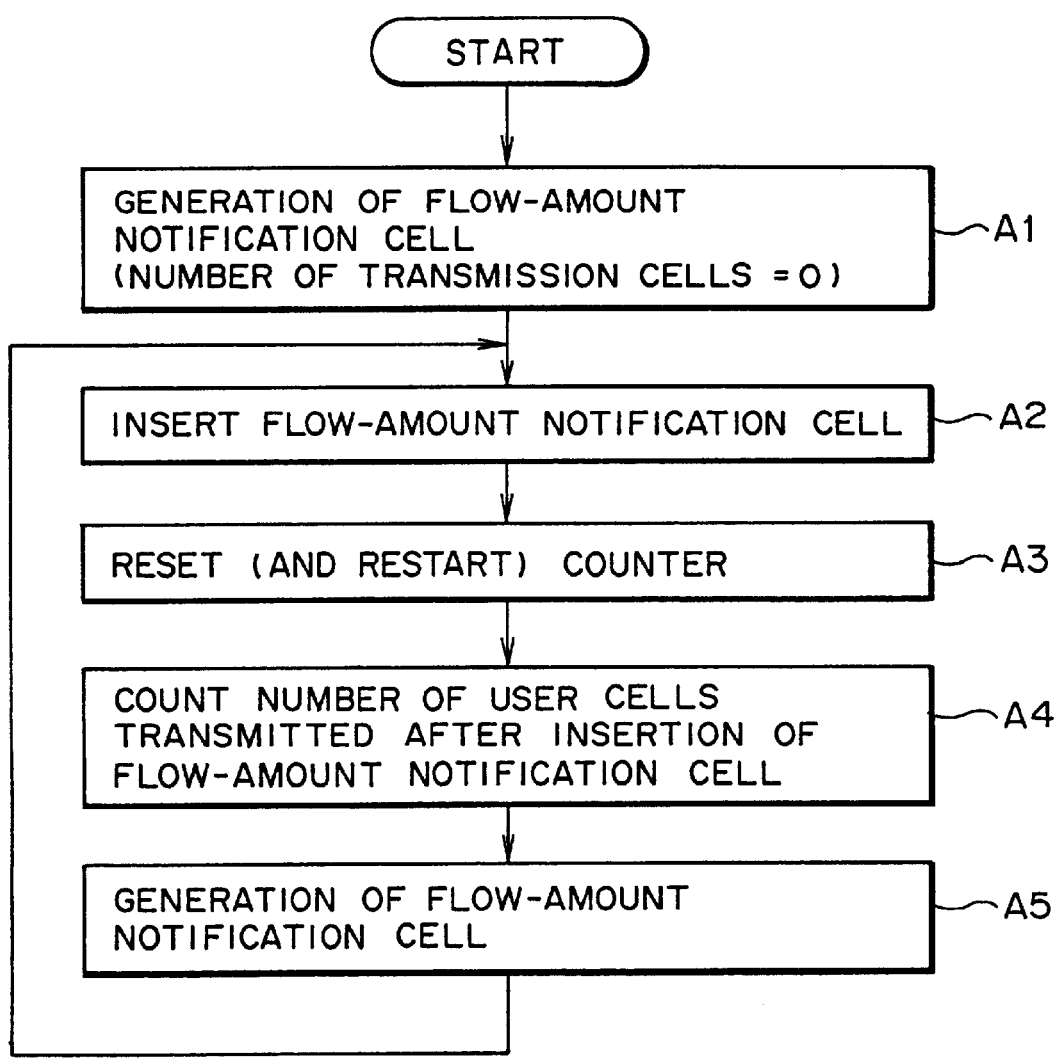
FIG. 12 is a flowchart for explaining the operation of transmitting the flow-amount notification cell by the ATM router as a transmitter-side endsystem in the first example of the first embodiment of the present invention.

FIG. 12 is a flowchart for explaining the Operation of transmitting the flow-amount notification cell by the ATM router 2-1 as a transmitter-side endsystem in the first example of the first embodiment of the present invention. In the first example, the receiver-side endsystem 3-1 sends only a congestion notification, i.e., the receiver-side endsystem 3-1 send no recovery notification.

Figure 8:
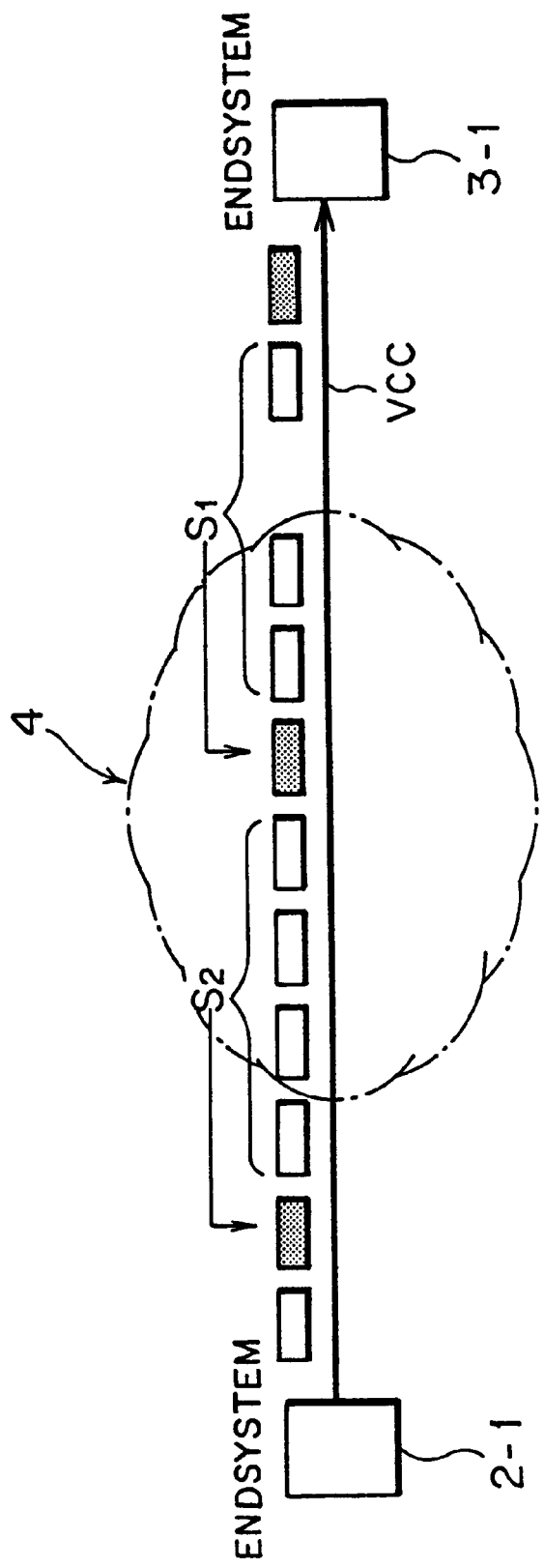
FIG. 8 is an explanatory diagram for explaining the operations of the ATM communication system containing the ATM routers in the first embodiment of the present invention.

First, in order to send to the receiver-side endsystem information $S_i$ (where i is an integer satisfying i>0) on the number of transmission cells which have been transmitted from the transmitter-side endsystem to a VCC for a certain duration, the transmitter-side endsystem 2-1 transmits a flow-amount notification cell which contains logical connection identifiers (VPI and VCI) identifying the VCC and the above information $S_i$ as illustrated in FIG. 8.

That is, as illustrated in FIG. 12, in step A1, the flow-amount-notification-cell generation unit 16A-1 in the transmitter-side endsystem 2-1 generates for each VCC a flow-amount notification cell which contains the information $S_0$ on the number of transmission cells, where $S_0=0$. In step A2, the cell-insert-and-extract unit 15-2 inserts the flow-amount notification cell into the flow of user cells in the forward direction to transmit the flow-amount notification cell to the receiver-side endsystem 3-1. After the insertion, in step A3, the count for each VCC in the cell counter 151 is reset, and is restarted.

In step A4, the cell counter 151 counts the number of transmission cells $S_1$. At transmission timing for the next flow-amount-notification-cell, which is determined by the flow-amount-notification-cell interval control unit 16A-2, the flow-amount-notification-cell generation unit 16A-1 generates, in step A5, the next flow-amount notification cell which contains the information $S_1$ on the number of transmission cells counted by the cell counter 151 until the above transmission timing. Then, in step A2, the cell-insert-and-extract unit 15-2 inserts the generated flow-amount notification cell into the flow of user cells in the forward direction.

Thereafter, similar operations in steps A2 to A5 are repeated to generate and insert the flow-amount notification cell containing the information $S_i$ at the transmission intervals determined by the flow-amount-notification-cell interval control unit 16A-2. For example, when user cells are transmitted at 10 Mbps, and the flow-amount notification cells are transmitted at intervals of one second, one flow-amount notification cell is inserted for about 23,585 cells. In this case, a field of at least fifteen bits is required for indicating the number of transmission cells.

Figure 13:
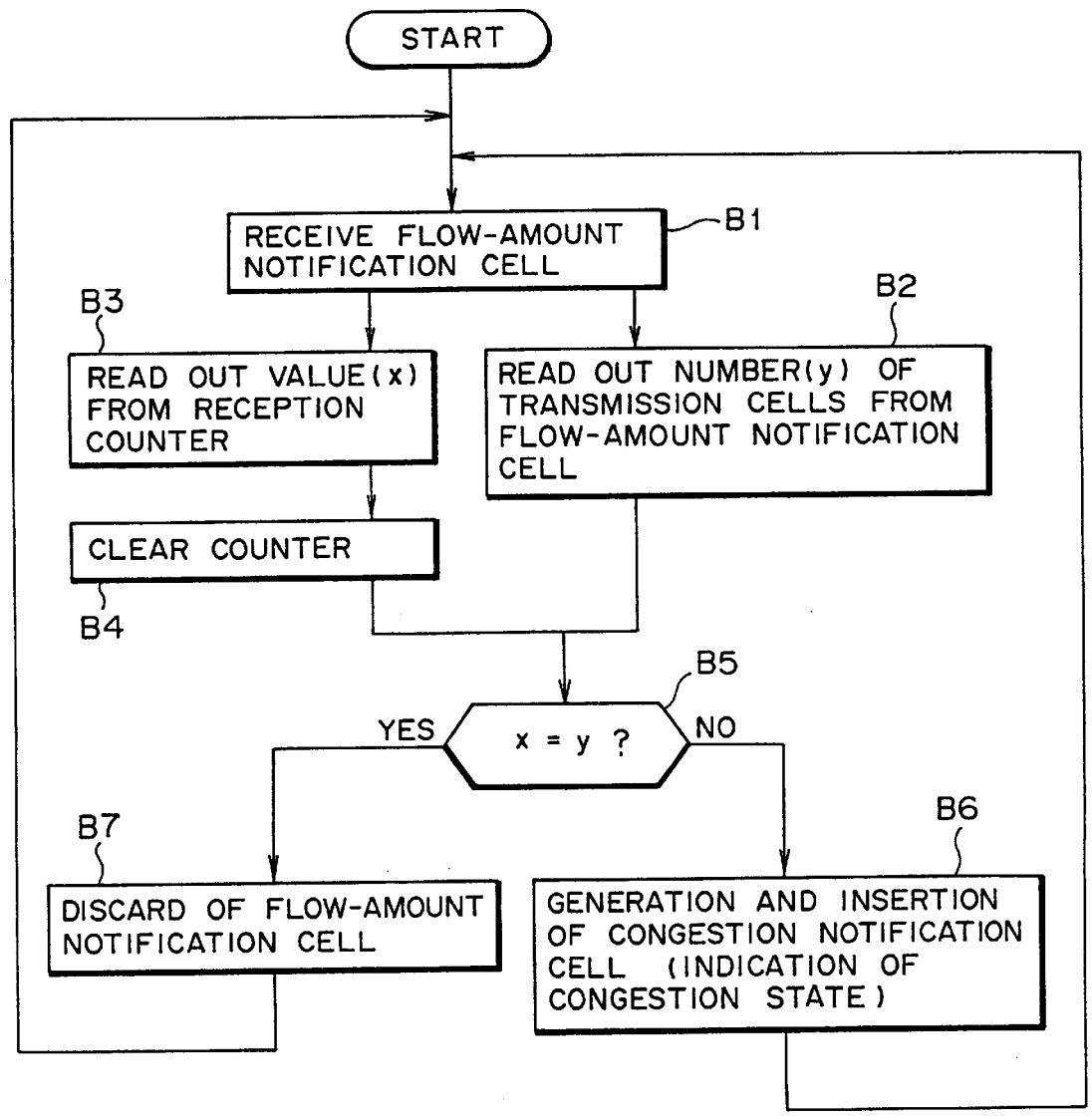
FIG. 13 is a flowchart for explaining the operations of detection and notification of congestion by the ATM router as a receiver-side endsystem in the first example of the first embodiment of the present invention.

FIG. 13 is a flowchart for explaining the operations of detection and notification of congestion by the ATM router 3-1 as a receiver-side endsystem in the first example of the first embodiment of the present invention.

When the receiver-side endsystem 3-1 receives the flow-amount notification cell transmitted from the transmitter-side endsystem 2-1 as above, in step B1, the flow-amount notification cell is extracted by the cell-insert-and-extract unit 15-2, and transferred to the congestion detection unit 16B in the congestion control unit 16-1.

In step B2, the transmission-cell-number recognition unit 16B-1 in the congestion detection unit 16B recognizes the number $S_i$ (indicated by y in FIG. 13) of transmission cells from the information which is contained in the received flow-amount notification cell and indicates the number $S_i$. At the same time, in step B3, the cell-number comparison unit 16B-2 obtains the number of reception cells (indicated by x in FIG. 13) which is counted by the cell counter 151 until the flow-amount notification cell is received. Then, in step B4, the cell counter 151 is cleared (reset). In step B5, the cell-number comparison unit 16B-2 compares these numbers x and y to determines whether or not the number x and y are identical.

Figure 9:
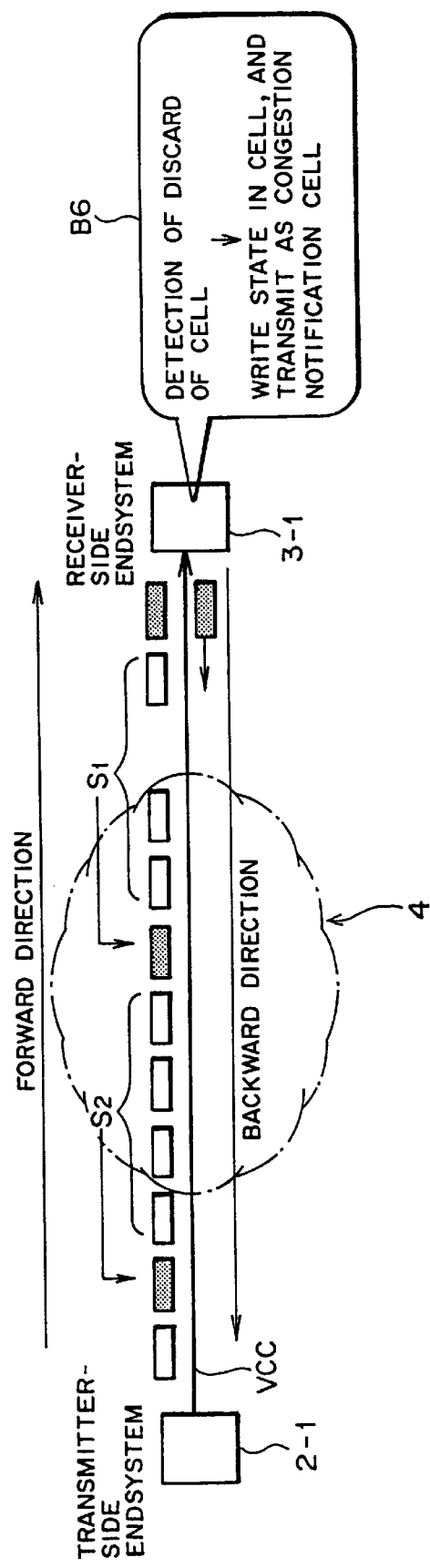
FIG. 9 is another explanatory diagram for explaining the operations of the ATM communication system containing the ATM routers in the first embodiment of the present invention.

When the above numbers x and y are different, i.e., when x<y, the congestion state determining unit 16B-3 recognizes that 4a cell has been discarded in the ATM communication network 4, i.e., congestion has occurred. That is, the congestion in the ATM communication network 4 is detected. In response to the detection of the congestion, the congestion-state-notification-cell generation unit 16C-1 generates a congestion notification cell by including an indication of the congestion state in the received flow-amount notification cell, and in step B6, the cell-insert-and-extract unit 15-2 inserts the generated congestion notification cell into the user cells in the backward direction to be transmitted to the transmitter-side endsystem 2-1, as schematically indicated in FIG. 9.

When a congestion state (i.e., discard of a cell) in the ATM communication network 4 is not detected by the congestion detection unit 16B, and the buffer monitor unit 16B-4 detects a congestion state of the receiver-side endsystem 3-1 (for example, as an overflow of the buffer in the receiver-side endsystem 3-1), the congestion-state-notification-cell generation unit 16C-1 in the receiver-side endsystem 3-1 generates a congestion notification cell indicating the congestion state of the receiver-side endsystem 3-1, and transmits the congestion notification cell in the, backward direction.

When the cell-number comparison unit 16B-2 determines that the number x and y are identical, the congestion state determining unit 16B-3 recognizes that the ATM communication network 4 is in a normal state. Therefore, the received flow-amount notification cell is discarded in step B7, and the generation and insertion of the congestion notification cell are not performed. That is, the receiver-side endsystem 3-1 transmits the congestion notification cell indicating the congestion state only when the congestion state of the ATM communication network 4 or the receiver-side endsystem 3-1 is detected.

Figure 14:
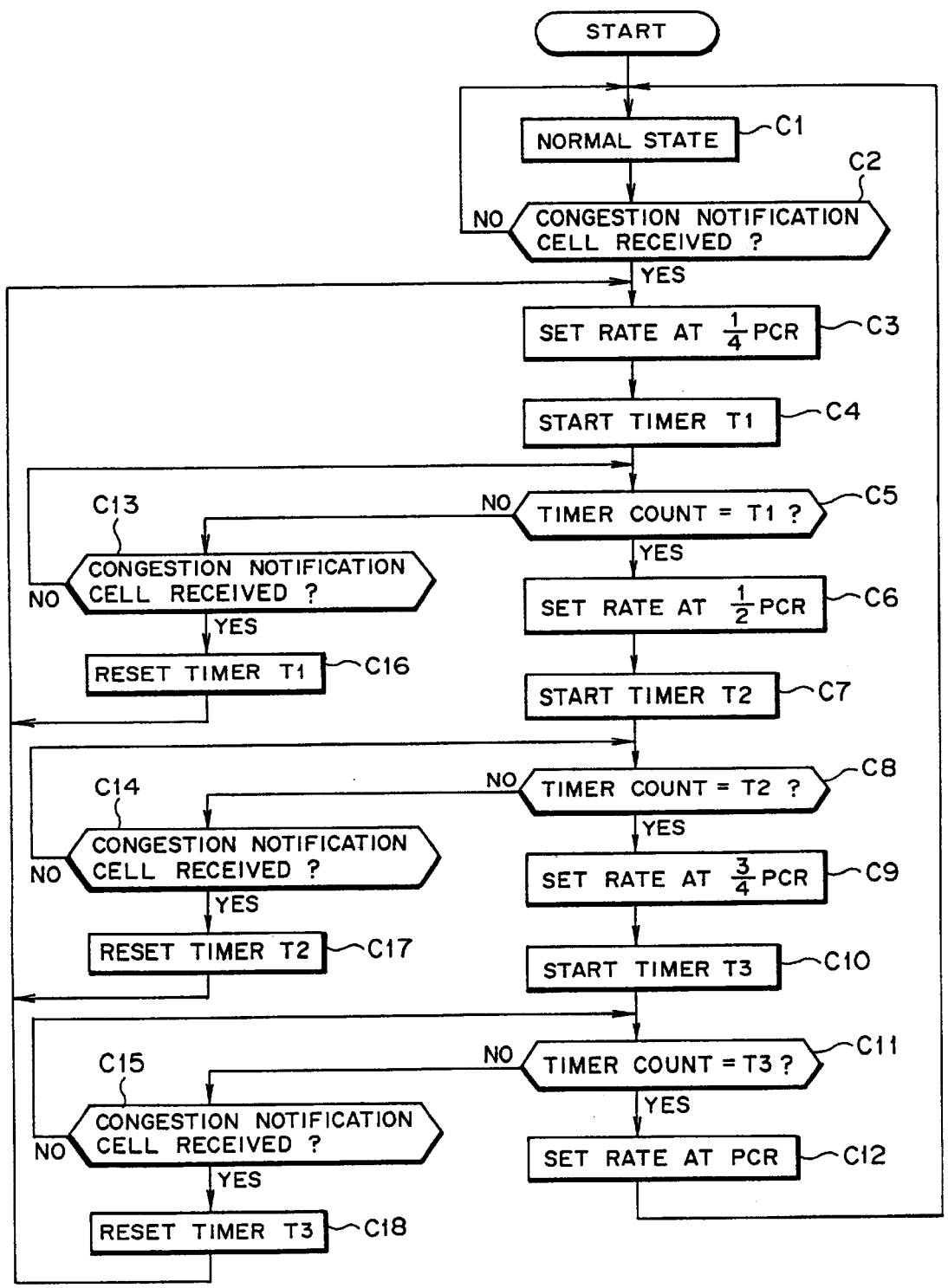
FIG. 14 is a flowchart for explaining the transmission-cell rate control by the ATM routers as a transmitter-side endsystem in the first example of the first embodiment of the present invention.
Figure 15:
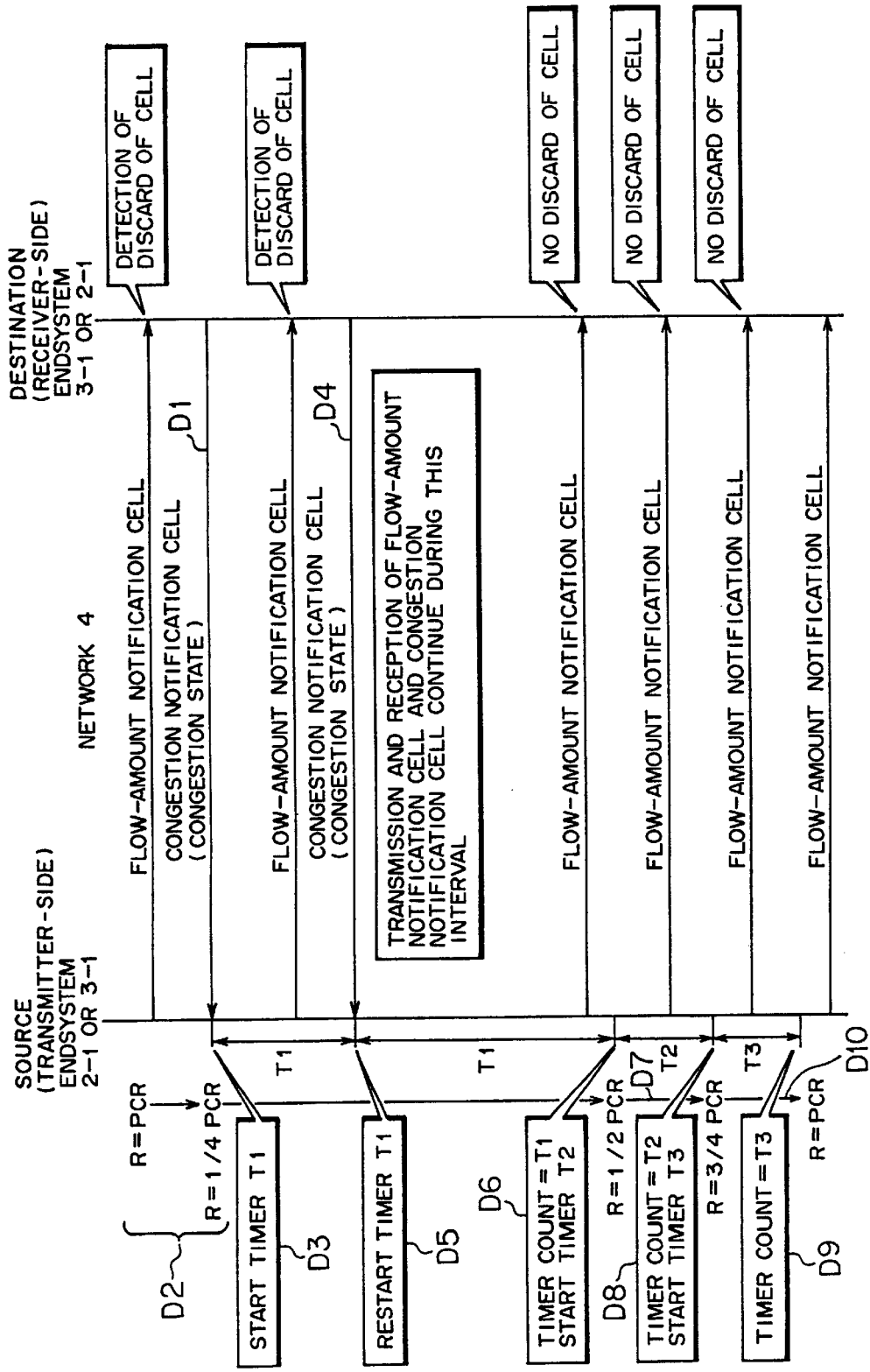
FIG. 15 is a sequence diagram illustrating communication between endsystems, provided for explaining the transmission cell rate control by the ATM routers as a transmitter-side endsystem in the first example of the first embodiment of the present invention.

FIGS. 14 and 15 are a flowchart and a sequence diagram illustrating the operations of the transmission cell rate control by the ATM routers 2-1 as a transmitter-side endsystem in the first example of the first embodiment of the present invention.

In the transmitter-side endsystem 2-1, in the normal state, cells are transmitted at a PCR (as indicated in step C1), and then it is determined whether or not a congestion notification cell is received (step C2). That is, the received cells are regularly monitored by the cell-insert-and-extract unit 15-2 to detect reception of a congestion notification cell. When a congestion notification cell for a VCC is received (D1 in FIG. 15), the rate control unit 15-1 reduces the transmission cell rate for the VCC to one fourth (step C3 in FIG. 14 and D2 in FIG. 15), to prevent discard of a further cell in the ATM communication network 4 or congestion in the receiver-side endsystem 3-1.

Then, the rate,control unit 15-1 starts the timer T1 in the timer unit 16-3 (step C4 in FIG. 14 and D3 in FIG. 15). Before the predetermined time T1 is counted by the timer T1, the rate control unit 15-1 monitors cells received at the cell-insert-and-extract unit 15-2 to detect reception of a congestion notification cell (step C13 in FIG. 14). When a congestion notification cell is received before the predetermined time T1 is counted by the timer T1 (D4 in FIG. 15), the rate control unit 15-1 resets. and restarts the timer T1 (steps C16 and C4 in FIG. 14 and D5 in FIG. 15), and maintains the transmission cell rate to the above VCC at one-fourth the PCR (step C3 in FIG. 14). On the other hand, when the congestion notification cell is not received in the predetermined time T1, the transmission cell rate is increased to one-half the PCR (step C6 in FIG. 14).

Then, the rate control unit 15-1 starts the timer T2 (step C7 in FIG. 14 and D6 in FIG. 15). Similar to the above operation on the timer T1, before the predetermined time T2 is counted by the timer T2, the rate control unit 15-1 monitors cells received at the cell-insert-and-extract unit 15-2 to detect reception of a congestion notification cell (step C14 in FIG. 14).

When a congestion notification cell is received before the predetermined time T2 is counted by the timer T2, the rate control unit 15-1 resets the timer T2 and restarts the timer T1 (steps C17 and C4 in FIG. 14 and D5 in FIG. 15), and reduces the transmission cell rate to the above VCC to one-fourth the PCR (step C3 in FIG. 14). On the other hand, when the congestion notification cell is not received in the predetermined time T2, the transmission cell rate is increased to three-fourths the PCR (step C9 in FIG. 14 and D7 in FIG. 15).

When the congestion notification cell is not received in the predetermined time T2, the rate control unit 15-1 starts the timer T3 (step C10 in FIG. 14 and D8 in FIG. 15). Similar to the above operations on the timers T1 and T2, before the predetermined time T3 is counted by the timer T2, the rate control unit 15-1 monitors cells received at the cell-insert-and-extract unit 15-2 to detect reception of a congestion notification cell (step C15 in FIG. 14).

When a congestion notification cell is received before the predetermined time T3 is counted by the timer T3 (D9 in FIG. 15), the rate control unit 15-1 resets the timer T3 and restarts the timer T1 (steps C18 and C4 in FIG. 14 and D5 in FIG. 15), and reduces the transmission cell rate to the above VCC to one-fourth the PCR (step C3 in FIG. 14). On the other hand, when the congestion notification cell is not received in the predetermined time T3, the transmission cell rate is increased to the PCR (step C12 in FIG. 14 and D10 in FIG. 15). Thereafter, the above operations in steps C1 to C18 are repeated.

As described above with reference to FIGS. 14 and 15, when a predetermined time has elapsed without receiving a congestion notification cell after the transmission cell rate to a VCC is lowered in response to detection of congestion in the VCC, the transmitter-side endsystem 2-1 recognizes that the ATM communication network or the receiver-side endsystem has recovered from the congestion state, and the transmitter-side endsystem 2-1 increases the transmission cell rate to the VCC step by step.

(2) SECOND EXAMPLE

Figure 16:
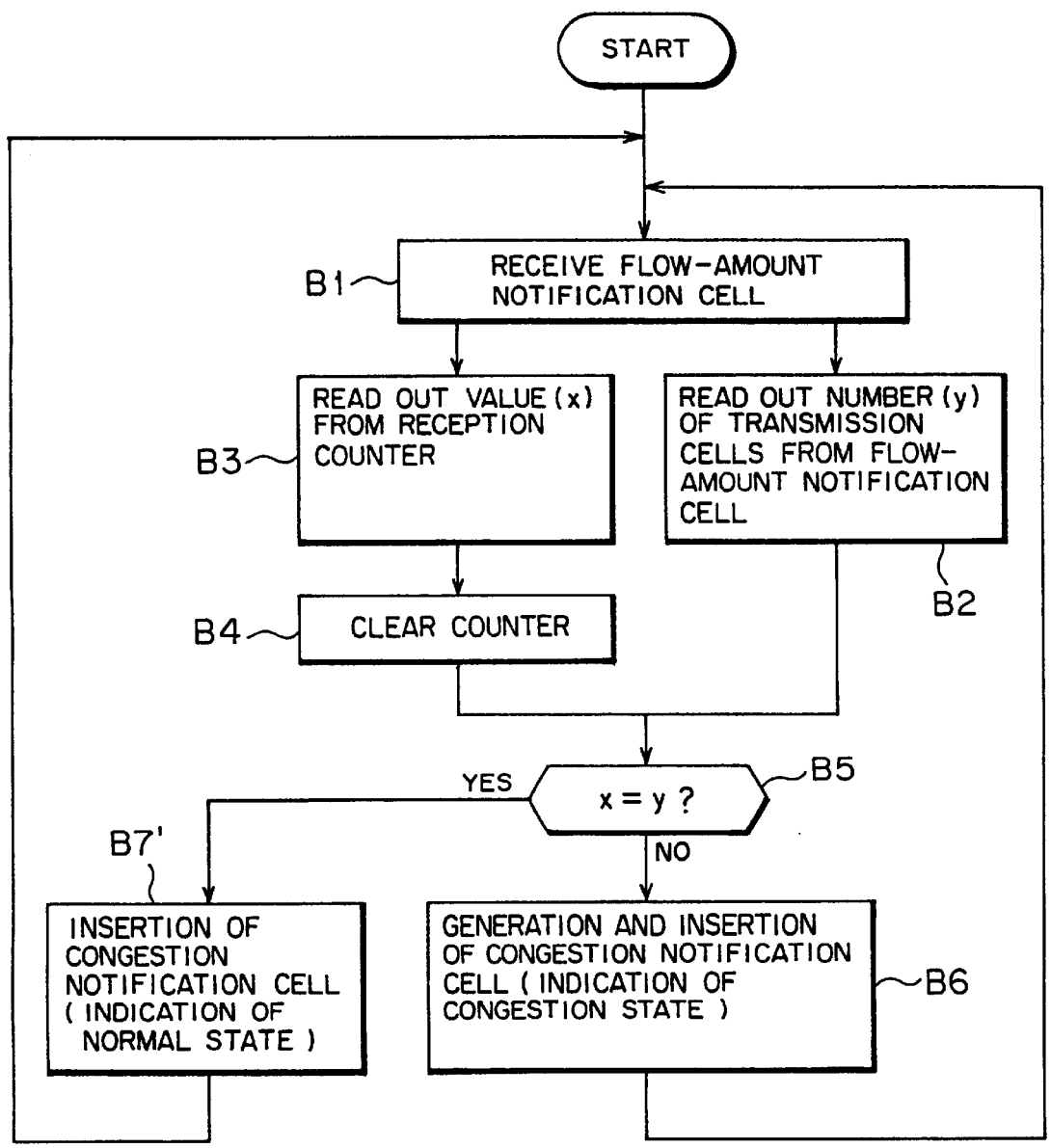
FIG. 16 is a flowchart for explaining the operations of detection and notification of congestion by the ATM router as a receiver-side endsystem in the second example of the first embodiment of the present invention.
Figure 17:
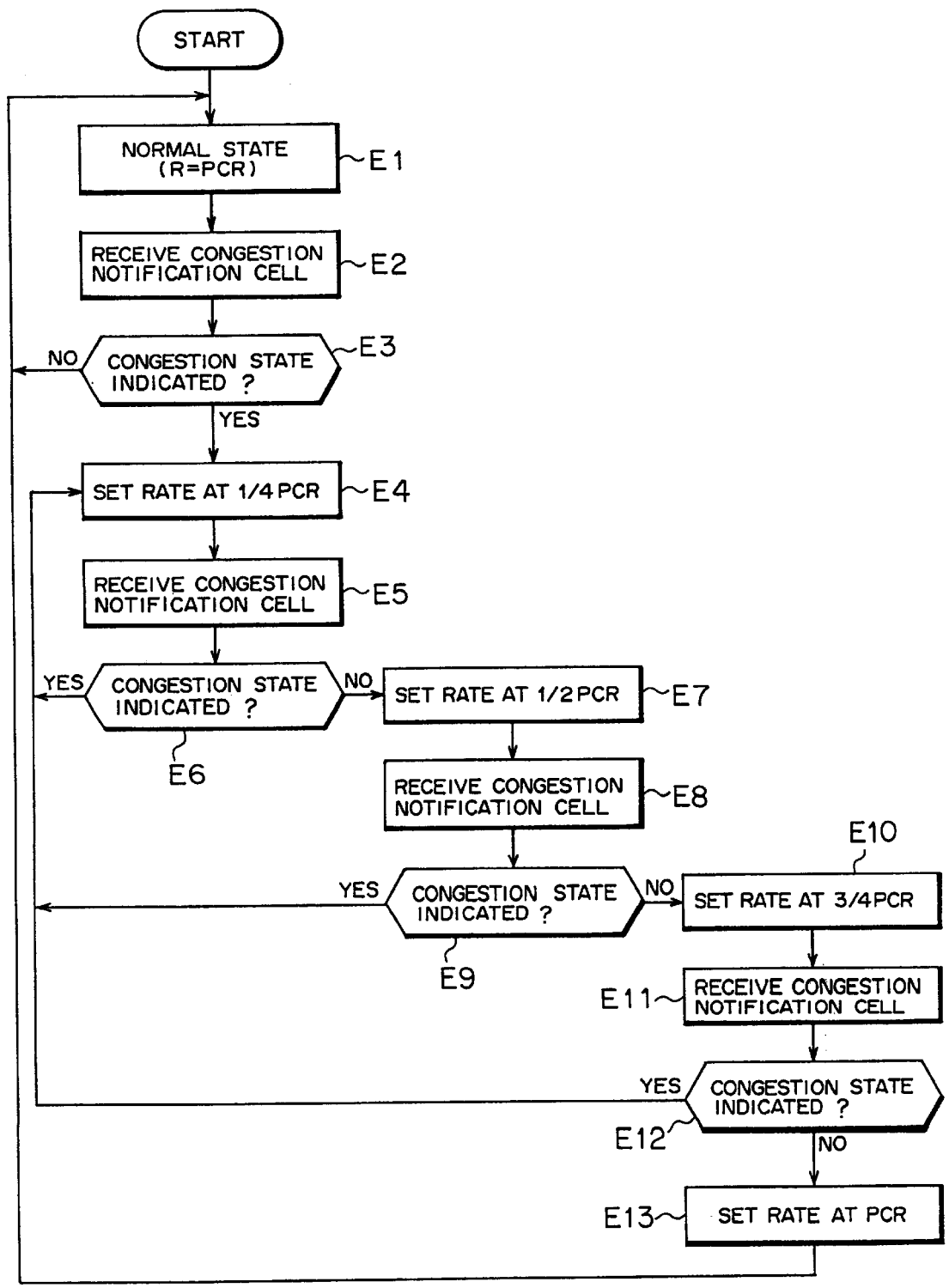
FIG. 17 is a flowchart for explaining transmission cell rate control by the ATM router as a transmitter-side endsystem in the second example of the first embodiment of the present invention.
Figure 18:
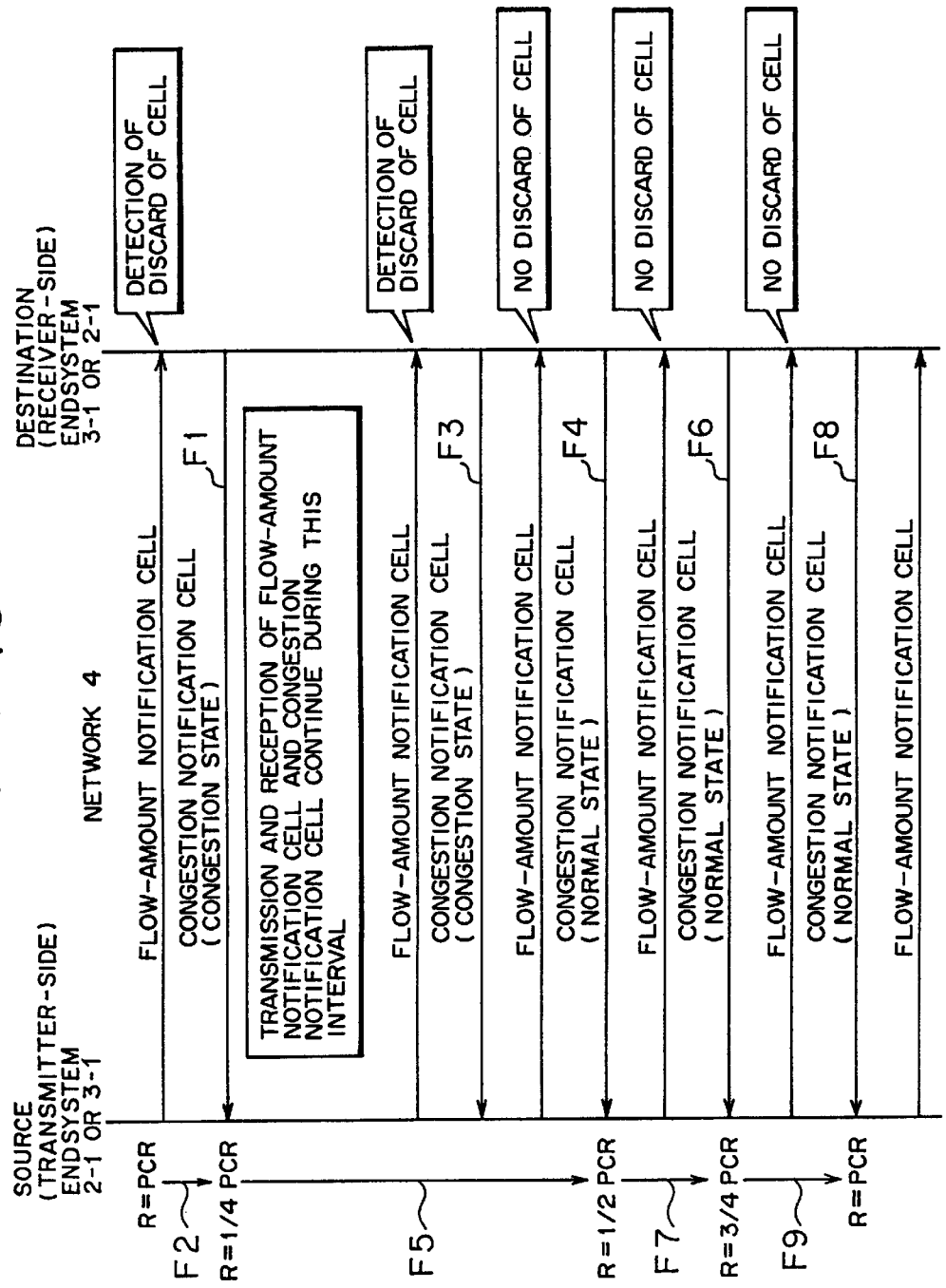
FIG. 18 is a sequence diagram illustrating communication between endsystems, provided for explaining transmission cell rate control by the ATM router as a transmitter-side endsystem in the second example of the first embodiment of the present invention.

FIGS. 16 is a flowchart for explaining the operations of detection and notification of congestion by the ATM router 3-1 as a receiver-side endsystem in the second example of the first embodiment of the present invention, FIG. 17 is a flowchart for explaining transmission cell rate control by the ATM router as a transmitter-side endsystem in the second example of the first embodiment of the present invention, and FIG. 18, is a sequence diagram illustrating a communication between endsystems, provided for explaining transmission cell rate control by the ATM router as a transmitter-side endsystem in the second example of the first embodiment of the present invention. In the second example, the receiver-side endsystem 3-1 sends both a congestion notification and a recovery notification.

As illustrated in FIG. 16, the operations of the receiver-side endsystem 3-1 in the second example are different from the operations of FIG. 13 (in the first example) in that a congestion notification cell indicating the normal state is generated and transmitted when the numbers are determined to be identical as the result of the comparison by the cell-number comparison-unit 16B-2 (step B7' in FIG. 16). That is, in the second example, the receiver-side endsystem 3-1 notifies the transmitter-side endsystem 2-1 of both the congestion state and the normal state of the ATM communication network 4 and/or the receiver-side endsystem 3-1 by a congestion notification cell.

Therefore, the transmitter-side endsystem 2-1 can increase the-transmission cell rate every time the transmitter-side endsystem 2-1 receives the congestion notification cell indicating the normal state, so that step-by-step rate control is enabled. For example, as illustrated in FIG. 17, when the transmitter-side endsystem 2-1 in the normal state in which cells are transmitted at a PCR as indicated in step E1 receives a congestion notification cell (step E2 in FIG. 17 and F1 in FIG. 18), the rate control unit 15-1 determines whether or not the congestion notification cell indicates a congestion state (step E3 in FIG. 17).

When the rate control unit 15-1 determines in step E3 that the congestion notification cell indicates a congestion state in a VCC, the rate control unit 15-1 reduces the transmission cell rate to the VCC from the PCR to one-fourth the PCR to prevent discard of a further cell in the ATM communication network 4 (step E4 in FIG. 17 and F2 in FIG. 18). When the rate control unit 15-1 determines in step E3 that the congestion notification cell indicates a normal state in a VCC, the rate control unit 15-1 maintains the transmission cell rate to the VCC at the PCR.

When the transmitter-side endsystem 2-1 receives a next congestion notification cell for the above VCC from the receiver-side endsystem 3-1 (step E5 in FIG. 17 and F3 in FIG. 18), the rate control unit 15-1 determines whether or not the congestion notification cell indicates a congestion state (step E6 in FIG. 17) in the VCC. When the rate control unit 15-1 determines in step E6 that the congestion notification cell indicates a congestion state in the VCC, the rate control unit 15-1 maintains the transmission cell rate to the VCC at one-fourth the PCR, based on recognition that the congestion state continues (step E4 in FIG. 17). Otherwise, when the rate control unit 15-1 determines in step E6 that the congestion notification cell indicates a normal state in the VCC, the rate control unit 15-1 increases the transmission cell rate to the VCC to one-half the PCR, based on recognition that the ATM communication network 4 or the receiver-side endsystem 3-1 has recovered from the congestion state (step E7 in FIG. 17 and F4 and F5 in FIG. 18).

When the transmitter-side endsystem 2-1 receives a further congestion notification cell for the above VCC from the receiver-side endsystem 3-1 (in step E8 in FIG. 17 and F6 in FIG. 18) after the above increase in the transmission cell rate to one-half the PCR in step E7, the rate control unit 15-1 determines whether or not the congestion notification cell indicates a congestion state (step E9 in FIG. 17) in the VCC. When the rate control unit 15-1 determines in step E9 that the congestion notification cell indicates a congestion state in the VCC, the rate control unit 15-1 reduces the transmission cell rate to the VCC from the one-half the PCR to one-fourth the PCR (step E4 in FIG. 17). Otherwise, when the rate control unit 15-1 determines in step E9 that the congestion notification cell indicates a normal state in the VCC, the rate control unit 15-1 increases the transmission cell rate to the VCC from the one-half the PCR to three-fourths the PCR (step E10 in FIG. 17 and F7 in FIG. 18).

When the transmitter-side endsystem 2-1 receives a still further congestion notification cell for the above VCC from the receiver-side endsystem 3-1 (in step E11 in FIG. 17 and F8 in FIG. 18) after the above increase in the transmission cell rate to three-fourths the PCR in step E10, the rate control unit 15-1 determines whether or not the congestion notification cell indicates a congestion state (step E12 in FIG. 17) in the VCC. When the rate control unit 15-1 determines in step E12 that the congestion notification cell indicates a congestion state in the VCC, the rate control unit 15-1 reduces the transmission cell rate to the VCC from the three-fourths the PCR to one-fourth the PCR, (step E4 in FIG. 17). Otherwise, when the rate control unit 15-1 determines in step E12 that the congestion notification cell indicates a normal state in the VCC, the rate control unit 15-1 increases the transmission cell rate to the VCC from the three-fourths the PCR to the PCR (step E13 in FIG. 17 and F9 in FIG. 18).

That is, the transmission cell rate is increased as triggered by the reception of the congestion notification cell, i.e., the transmission cell rate is increased from 1/4PCR to 1/2PCR when the transmitter-side endsystem 2-1 receives the first congestion. notification cell (indicating a normal state) after congestion occurs; the transmission cell rate is increased from 1/2PCR to 3/4PCR when the transmitter-side endsystem 2-1 receives the second congestion notification cell (indicating a normal state); and the transmission cell rate is increased from 3/4PCR to PCR when the transmitter-side endsystem 2-1 receives the third congestion notification cell (indicating a normal state).

Otherwise, even when the receiver-side endsystem 3-1 sends both a congestion notification and a recovery notification, the transmission cell rate may be increased step by step triggered by the elapse of the predetermined times counted by the timers until a congestion indicating a congestion state is received, as explained for the first example (1) wherein the receiver-side endsystem 3-1 sends only a congestion notification and does not send a recovery notification.

Although, in the above examples, the transmitter-side endsystem 2-1 reduces the transmission cell rate down to one-fourth the PCR, of course, the transmission cell rate may be reduced to other values. For example, in the case wherein the ATM communication network guarantees a minimum cell rate (MCR) such as the case of the ABR service, the discard of cells can be surely prevented by reducing the transmission cell rate to the minimum cell rate (MCR).

As described above, according to the present invention, when a congestion state of the ATM communication network 4 or the receiver-side endsystem 3-1 is detected for a VCC by the receiver-side endsystem 3-1, and the transmitter-side endsystem 2-1 is notified of the congestion state, it is possible to prevent discard of a further cell and recover the ATM communication network 4 or the receiver-side endsystem 3-1 from the congestion state by lowering the transmission cell rate to the VCC. Therefore, contribution of the present invention to improvement in reliability is great.

In addition, when the transmitter-side endsystem 2-1 does not receive an additional congestion notification cell from the receiver-side endsystem 3-1 after a congestion notification cell is received, or when the transmitter-side endsystem 3-1 receives a recovery notification, the transmitter-side endsystem 2-1 recognizes that the congestion state has been relieved, and returns (increases) the transmission cell rate to the original value before the reception of the congestion notification. Therefore, resources in the ATM communication network 4 can be utilized efficiently. Further, since in this case, the transmission cell rate is increased step by step, it is possible to remarkably reduce the probability that the ATM communication network 4 goes back to the congestion state due to a sudden increase in the transmission cell rate. Therefore, reliability of communication between the endsystems 2-1 and 3-1 can be maintained.

Incidentally, in order to realize fairness to all the VCCs which can be set in the ATM communication network 4, it is essential for the receiver-side endsystem to detect congestion and perform the rate control in an almost identical manner for all the VCCs. Therefore, it is preferable to make the transmission intervals of the flow-amount notification cells short and identical for all the VCCs.

Figure 11:
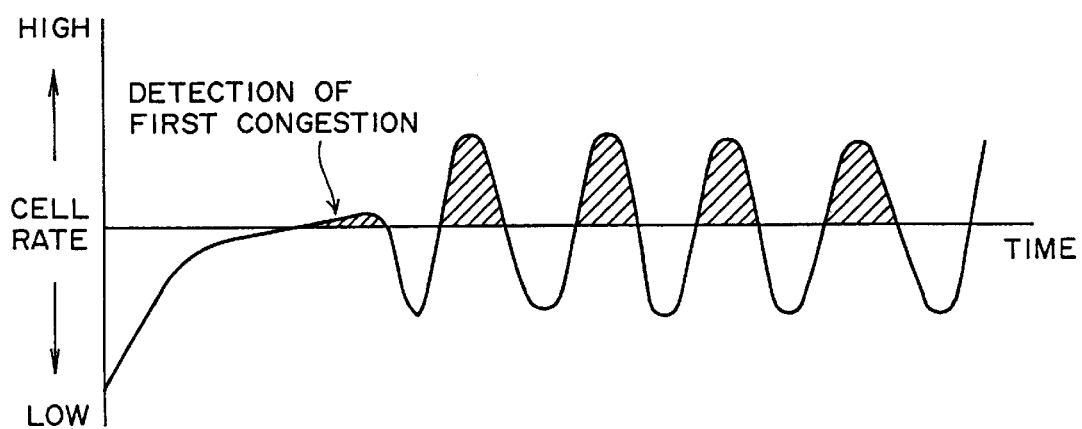
FIG. 11 is a diagram for explaining the transmission cell rate control (not for a virtual channel connection) by the ATM routers in the first embodiment of the present invention.

However, when the transmission intervals of the flow-amount notification cells are made short and identical for all the VCCs, variations of the transmission cell rates in more than one VCC are likely to occur concurrently in a short time, and therefore it may not be possible to efficiently use the resources in the ATM communication network 4. For example, as illustrated in FIG. 11, frequency of a variation in the cell rate is increased, due to a repeated sequence of occurrence of congestion, reduction of cell rate, prevention of congestion, and increase of cell rate. Therefore, in this embodiment, when congestion occurs, the flow-amount-notification-cell interval control unit 16A-2 randomly increases the transmission intervals of the flow-amount notification cells for each VCC. That is, unfairness to VCCs is accepted.

Thereby, the number of the flow-amount notification cells after a congestion notification is received is smaller than the number of the flow-amount notification cells in a normal state, and therefore deterioration of the congestion state of the ATM communication network 4 is suppressed. That is, reliability of communication between endsystems 2-1 and 3-1 is improved, and processing load on the endsystems 2-1 and 3-1 is reduced.

Figure 10:
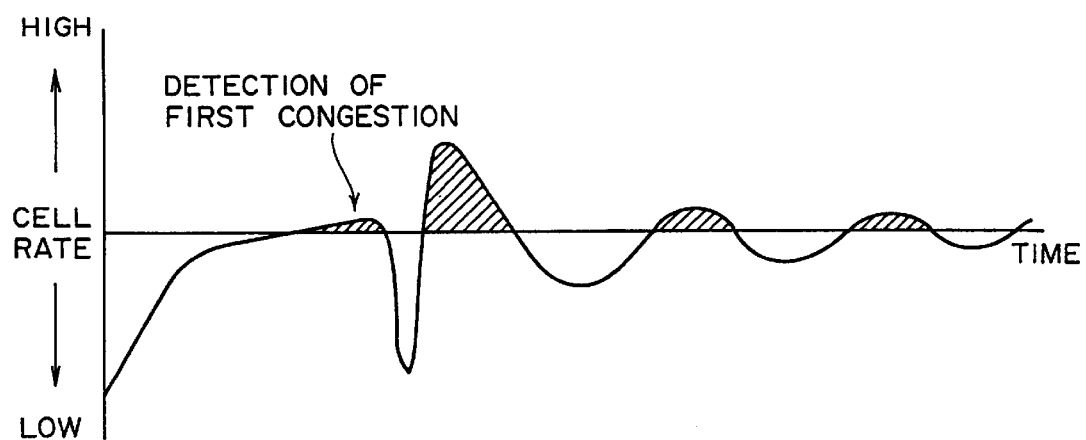
FIG. 10 is a diagram for explaining the transmission cell rate control (for a virtual channel connection) by the ATM routers in the first embodiment of the present invention.

In addition, in this case, timing of detection of congestion for respective VCCs disperse, and therefore timing of cell rate control for respective VCCs also disperse. Thus, the variation in the transmission cell rate is smoothed as illustrated in FIG. 10, duty factors of resources in the network are equalized, and the resources in the network can be utilized efficiently.

Thereafter, when the variation in the transmission cell rate becomes stable, the flow-amount-notification-cell interval control unit 16A-2 restores (shortens) the transmission intervals of the flow-amount notification cells for quick detection of the congestion state (i.e., discard of a cell).

The rate monitor unit 16-2 also determines whether or not the variation in the transmission cell rate becomes stable. In addition, since timing of transmission of the congestion notification cell from the receiver-side endsystem 3-1 depends on timing of transmission of the flow-amount notification cells from the transmitter-side endsystem 2-1, control of the timing of transmission of the congestion notification cell by the receiver-side endsystem 3-1 is unnecessary.

Sometime, various types of data, such as data which can endure cell loss, data which is vulnerable to cell loss, and data which must be always transferred with high priority are intermixed. For example, in TCP/IP or the like, an upper layer (protocol) guarantees retransmission. Therefore, data using such protocol can endure cell loss. In this embodiment, the upper-layer recognition unit 122 (in FIG. 3) recognizes attributes of user data, and the priority control unit 16-4 controls the rate control operations performed by the rate control unit 15-1, based on the recognized attributes.

For example, in FIG. 2, assuming that the hard disk 7 of the user A (the server 6) is shared by a plurality of users, and also operates as a printer server, and the user B (the server 8) is a usual host, the priority of the user data addressed to the user B is higher than the priority of the user data addressed to the user A which can be accessed by a plurality of users.

In this case, when the transmitter-side endsystem 2-1 recognizes a congestion state of the ATM communication network 4 or the receiver-side endsystem 3-1, the upper-layer recognition unit 122 recognizes the user data addressed to the user A and the user data addressed to the user based on their IP addresses of the destinations, and the priority control unit 16-4 controls the rate control unit 15-1 so as to reduce the transmission cell rate of the user data addressed to the user B with higher priority than the user data addressed to the user A. According to the circumstances, the transmission cell rate of the user data addressed to the user B is reduced by discarding the user data (cells).

Thereby, the user data addressed to the user A is always transmitted with higher priority in a VCC. Therefore, necessary bandwidth, i.e., quality of service (QOS), for the user data addressed to the user A is guaranteed.

As described above, the transmitter-side endsystem 2-1 can provide high-quality service by a combination of the rate control for preventing congestion (discard of cells) in the ATM communication network 4 and the receiver-side endsystem 3-1 at the VCC level and the priority control based on recognition of the attributes of data.

In addition, it is possible to recognize the attributes of data and perform priority control by recognizing a protocol or an address such as items (i) to (v) indicated below. Regarding the items (iii) to (v), the priority or nonpriority may be determined based on a destination address only, a source address only, or a combination of the destination address and the source address.

(i) Protocol classification in upper layers.

For example, in the case of TCP/IP, the upper layers such as a Session layer, a Presentation layer, and an Application layer are not classified clearly. However, a plurality of protocols such as File Transfer Protocol (FTP), TELNET, Simple Mail Transfer Protocol (SMTP), and the like are provided in TCP/IP.

(ii) Protocol classification in the Network layer, e.g., IP, IPX, AppleTalk, and the like (iii) Port number in the Transport layer, e.g., a destination port number and a source port number (iv) Address in the Network layer, e.g., a destination IP address and a source IP address in the case of Internet Protocol (IP)

(v) Address in the Data Link layer, e.g., a destination MAC (Media Access Control) address and a source MAC address in the case wherein the Data Link layer is Ethernet 802.3 CSMA/CD.

Further, all the operations described above, including the detection of congestion, the rate control, and the priority control, are also applicable to the case of the SVC, in addition to the above cases of the permanent virtual connection (PVC). However, in the case of SVC service, the above operations are performed after a VCC is established by transmission of signaling messages between the endsystems 2-1 and 3-1.

As described above, according to the ATM communication system 1-1 containing the endsystems 2-1 and 3-1 as the first embodiment of the present invention, the endsystems 2-1 and 3-1 by themselves can detect a congestion state in the network 4 in the ATM layer, even when using a low-price and low-cost service which does not have a function of notifying a user of a congestion state in the network, or when using a network does not have that function. The currently available ATM leased-line (PVC) service and ATM public network (SVC) service are such a low-price and low-cost service.

Therefore, it is possible to perform cell rate control for avoiding congestion to minimize the cell loss. Thus, reliability of communication is improved, high-quality communication service can be provided, and resources in the network can be used most efficiently. In particular, since in this embodiment, the priority control based on the attributes of user data to be transmitted is combined with the rate control in the transmitter-side endsystem 2-1, transmission of user data having high priority is guaranteed, and high-quality communication service can be provided.

In addition, no modification such as addition of a function is required for the ATM communication network 4 in this embodiment, while the ABR service requires support by both the network 4 and the endsystems 2-1 and 3-1 and complicated control for realizing the function of congestion notification. Therefore, in this embodiment, it is possible to realize the function of detection and avoidance of congestion at very low cost, compared with the cost for realizing the ABR service.

Further, it is possible to easily detect a congestion state of the legacy ATM communication network 4 while maintaining compatibility with the ATM communication network 4, by using the format of OAM cell (LB cell) or RM cell for generating the flow-amount notification cell and the congestion notification cell and maintaining affinity for ATM standard.

Since in this embodiment, the receiver-side endsystem 3-1 can also notify the transmitter-side endsystem 2-1 of the congestion state of the receiver-side endsystem 3-1 by using the congestion notification cell, it is also possible to relieve a congestion state of the receiver-side endsystem 3-1. Therefore, reliability of communication between the endsystems 2-1 and 3-1 can be further improved.

In this embodiment, the transmitter-side endsystem 2-1 indicates in the flow-amount notification cell the number of user cells which have been transmitted, and the receiver-side endsystem 3-1 counts the number of received user cells until the receiver-side endsystem 3-1 receives the flow-amount notification cell. Instead, it is possible to indicate in the flow-amount notification cell the number of user cells which are to be transmitted after the current flow-amount notification cell until the next flow-amount notification cell is transmitted, and the receiver-side endsystem 3-1 can count the number of user cells until the next flow-amount notification cell is received after the current flow-amount notification cell is received.

IV. Second Embodiment

Figure 19:
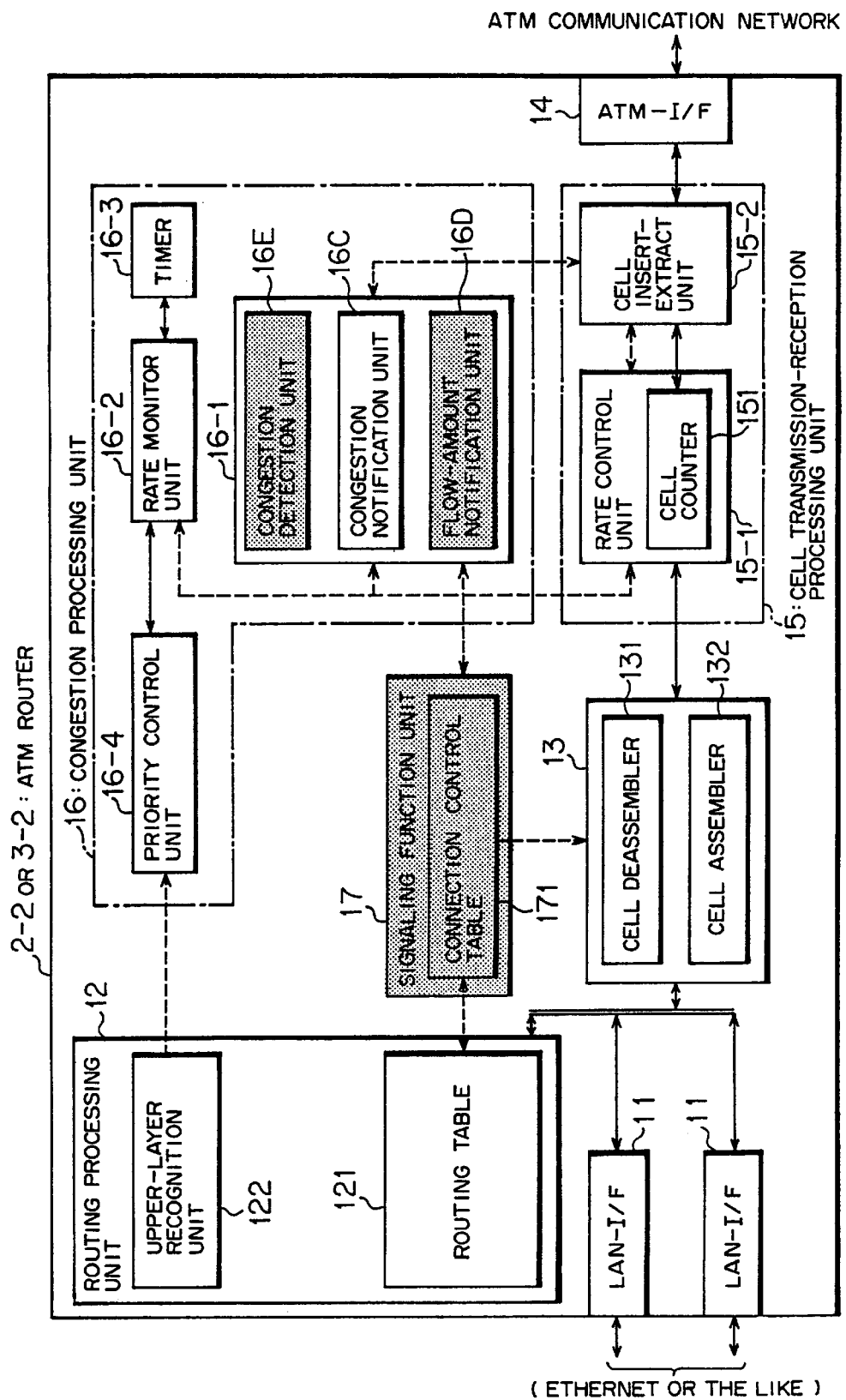
FIG. 19 is a block diagram illustrating the construction of the ATM router (as an ATM communication apparatus) in the second embodiment of the present invention.

FIG. 19 is a block diagram illustrating the construction of the ATM router (as an ATM communication apparatus) in the second embodiment of the present invention. The second embodiment of the present invention realizes the second, fourth, sixth, and eighth aspects of the present invention. Although the ATM router 2-2 or 3-2 can also be used in an ATM communication system 1-2 configured as illustrated in FIG. 2, instead of the ATM router 2-1 or 3-1 in the first embodiment, the construction of FIG. 19 is different from the construction of FIG. 3 in that the congestion control unit 16-1 contains a signaling function unit 17, a flow-amount notification unit 16D is provided instead of the flow-amount notification unit 16A in FIG. 3, and a congestion detection unit 16E is provided instead of the congestion detection unit 16B in FIG. 3. In. FIG. 19, blocks of the above elements which are different from the construction of FIG. 3 are indicated by halftone.

When the ATM router 2-2 is a transmitter-side endsystem, the flow-amount notification unit 16D sends a control cell (which is also denoted as a flow-amount notification cell in the second embodiment) to the receiver-side endsystem 3-2, where the flow-amount notification cell indicates an interval of a predetermined (and preset) number of transmission cells (i.e., predetermined amount of transmission data) to a VCC (or an end of each interval). That is, the receiver-side endsystem 3-2 is notified of the above interval. Similar to the first embodiment, the format of the OAM cell or the RM cell may be used for the above flow-amount notification cell.

The congestion detection unit 16E functions as the aforementioned congestion-state detection unit, and compares the above predetermined number of transmission cells with the number of reception cells which have been received (and counted by the cell counter 151) between the above flow-amount notification cells. Thus, it is possible to detect a congestion state of (cell loss in) the ATM communication network 4 in a similar manner to the first embodiment.

Figure 20:
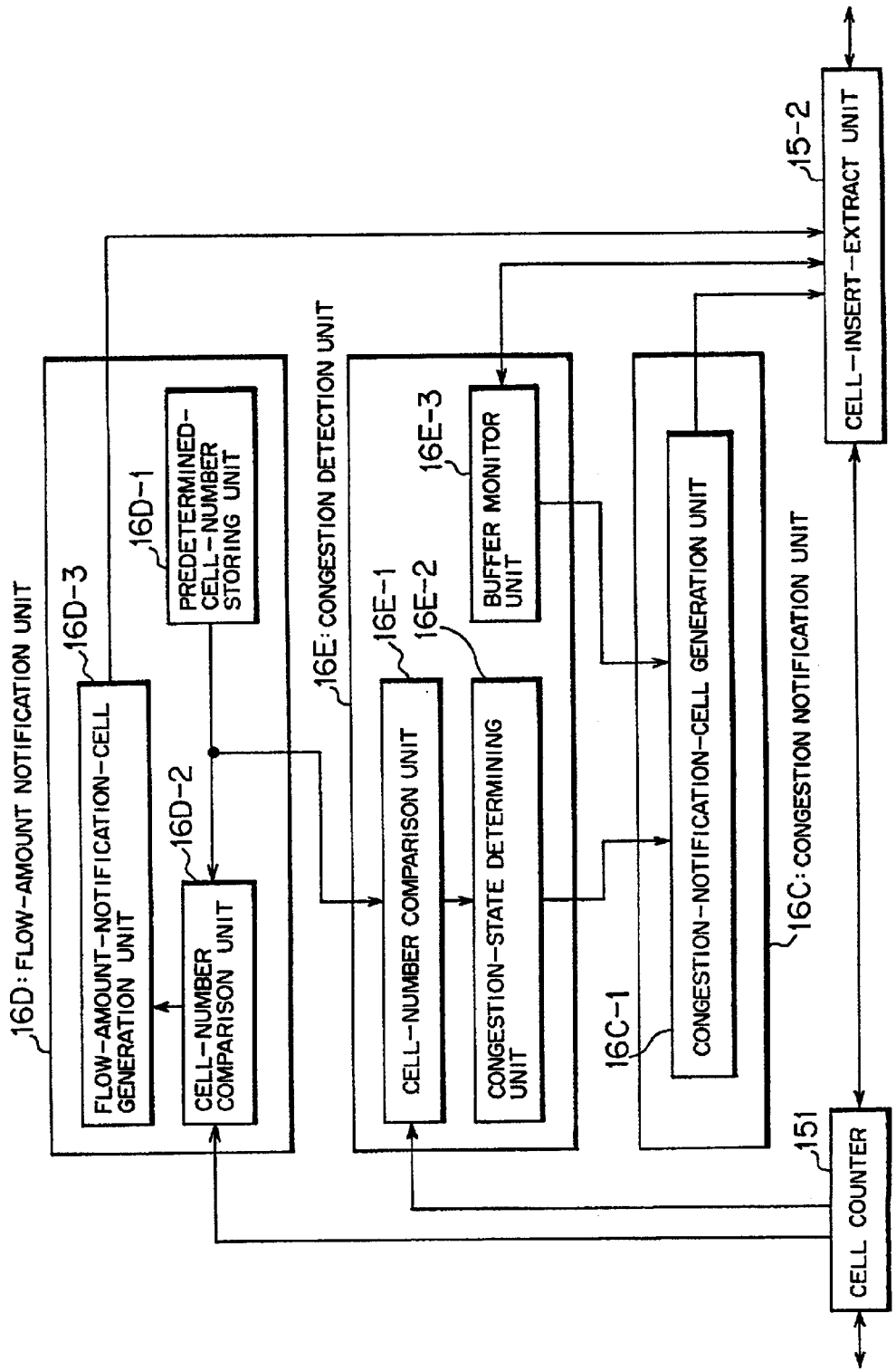
FIG. 20 is a block diagram illustrating the constructions of the flow-amount notification unit, the congestion detection unit, and the congestion notification unit in the ATM router illustrated in FIG. 19.

FIG. 20 is a block diagram illustrating the constructions of the flow-amount notification unit 16D, the congestion detection unit 16E, and the congestion notification unit 16C in the ATM router illustrated in FIG. 19.

In order to realize the above operations of the flow-amount notification-unit 16D and the congestion detection unit 16E, for example, as illustrated in FIG. 20, the flow-amount notification unit 16D contains a predetermined-cell-number storing unit 16D-1 a cell-number comparison unit 16D-2 and a flow-amount-notification-cell generation unit 16D-3, and the congestion detection unit 16E contains a cell-number comparison unit 16E-1, a congestion state determining unit 16E-2, and a buffer monitor unit 16E-3.

In the flow-amount-notification unit 16D, the predetermined-cell-number storing unit 16D-1 stores (information on) a predetermined number of transmission cells for each VCC. The predetermined-cell-number storing unit 16D-1 functions as the aforementioned first predetermined-amount storing unit 20 in FIG. 1B when the ATM router is the transmitter-side endsystem, and as the aforementioned second predetermined-amount storing unit 30 in FIG. 1B when the ATM router is the receiver-side endsystem. The predetermined-cell-number storing unit 16D-1 may not be provided in the flow-amount notification unit 16D as, illustrated in FIG. 20, and may be provided anywhere in the ATM router 2-2 or 3-2.

The cell-number comparison unit 16D-2 functions as the aforementioned second data-amount comparison unit, and compares the above predetermined number of transmission cells stored in advance in the predetermined-cell-number storing unit 16D-1 for a VCC, with the number of transmission cells counted by the cell counter 151 for the VCC. The flow-amount-notification-cell generation unit 16D-3 generates a flow-amount notification cell which is addressed to the receiver-side endsystem 3-2 and indicates an end of the predetermined number of transmission cells, every time the above numbers become identical in the above comparison by the cell-number comparison unit 16D-2.

On the other hand, when the ATM router in FIG. 19 is receiver-side endsystem, the cell-number comparison unit 16E-1 in the congestion detection unit 16E functions as the aforementioned third data-amount comparison unit, and compares the above predetermined number of transmission cells stored in advance in the predetermined-cell-number storing unit 16D-1 for a VCC, with the number of reception cells counted by the cell counter 151 between the flow-amount notification cells from the transmitter-side endsystem 2-2.

The congestion state determining unit 16E-2 functions as the aforementioned second congestion-state determining unit, and determines that the ATM communication network 4 has discarded a cell and is in a congestion state when the above numbers compared by the cell-number comparison unit 16E-1 are different (i.e., the predetermined number of transmission cells is greater than the number of reception cells). The buffer monitor unit 16E-3 monitors free space in the buffer in the cell-insert-and-extract unit 15-2, and determines that the ATM router 2-2 to which the congestion detection unit. 16E belongs is in a congestion state when the buffer is full of data, or is being fully occupied by data, in a similar manner to the buffer monitor unit 16B-4 in the first embodiment.

The signaling function unit 17 operates in the case of the SVC service, i.e., when the VCCs are configured by using a public line. The operations of the signaling function unit 17 are explained later in detail.

In the case of PVC, for example, when a maintenance technician configures in advance the endsystems (ATM routers) 2-2 and 3-2 in the ATM communication system 1-2 as the second embodiment of the present invention so that the flow-amount notification cells are transmitted at intervals of 100 cells to a VCC, i.e., the maintenance technician stores information indicating the number, 100, for the VCC in the predetermined-cell-number storing unit 16D-1 of the endsystems (ATM routers) 2-2 and 3-2, the transmitter-side endsystem 2-1 generates a flow-amount notification cell for the VCC every time 100 cells have been transmitted to the VCC, and inserts the generated flow-amount notification cell into a flow of user cells in the forward direction.

Thereby, every time the receiver-side endsystem 3-2 receives the above flow-amount notification cell for the VCC, the cell-number comparison unit 16E-1 compares the number of user cells which have been received (and counted by the cell counter 151) for the VCC until the reception of the flow-amount notification cell, with the number stored in advance for the VCC in the predetermined-cell-number storing unit 16D-1, and the congestion state determining unit 16E-2 determines that the ATM communication network 4 has discarded a cell and detects a congestion state when the above numbers compared by the cell-number comparison unit 16E-1 are different. The count for each VCC of the cell counter 151 is reset (restarted) every time the flow-amount notification cell is received.

As described before, the detection of cell loss is enabled by sending the number of transmission cells per se by a flow-amount notification cell from the transmitter-side endsystem 2-1 to the receiver-side endsystem 3-1 ,in the first embodiment. On the other hand, in the second embodiment, similar detection of cell loss is enabled by notifying the receiver-side endsystem 3-2 of an end of transmission of a predetermined number of cells every time the predetermined number of cells have been transmitted from the transmitter-side endsystem 2-2, where the predetermined number is set in advance in both the endsystems 2-2 and 3-2.

In the second embodiment, it is not necessary to include the number of transmission cells per se, and only the notification of the end of transmission of a predetermined number of cells is required to be sent to the receiver-side endsystem. Therefore, according to the second embodiment, congestion can be detected by simpler processing than the first embodiment.

In addition, the operations of notifying the transmitter-side endsystem of congestion in response to detection of the congestion and the operations of rate control including the priority control are also performed in the second embodiment in a similar manner to the first embodiment, and therefore similar advantages are obtained.

Figure 23:
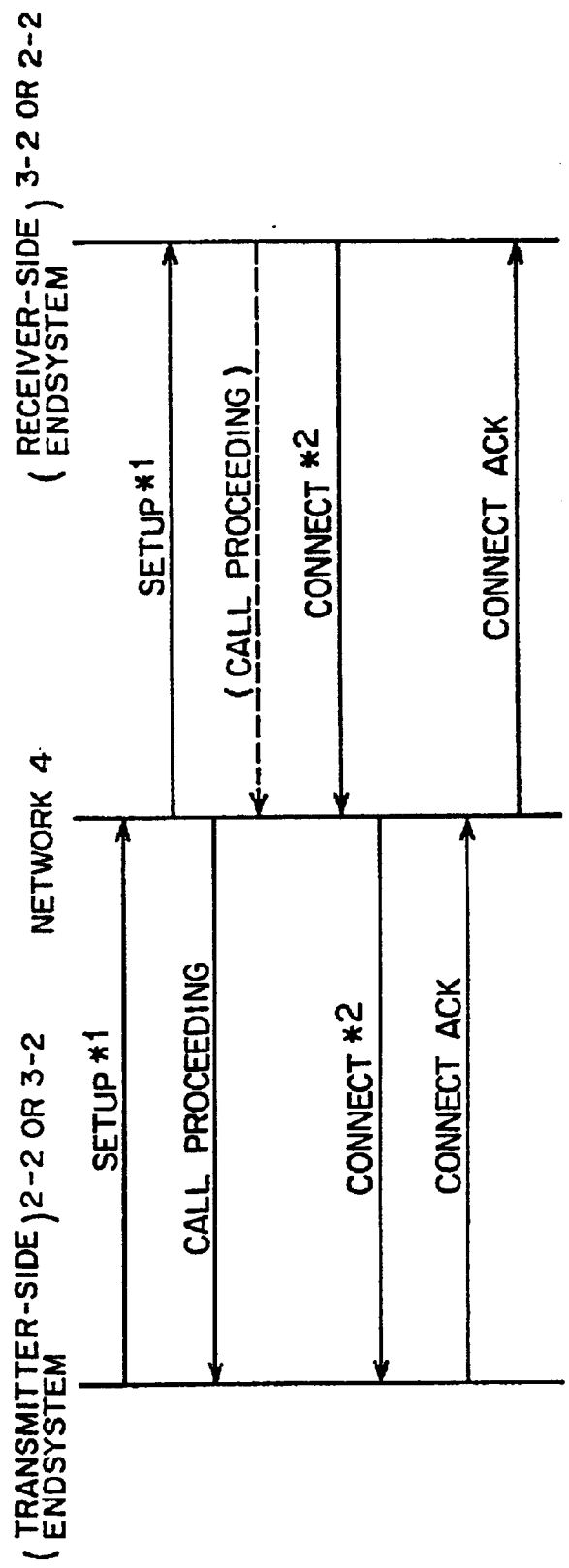
FIG. 23 is a sequence diagram illustrating a signaling procedure in the ATM communication system as the second embodiment of the present invention.
Figure 24:
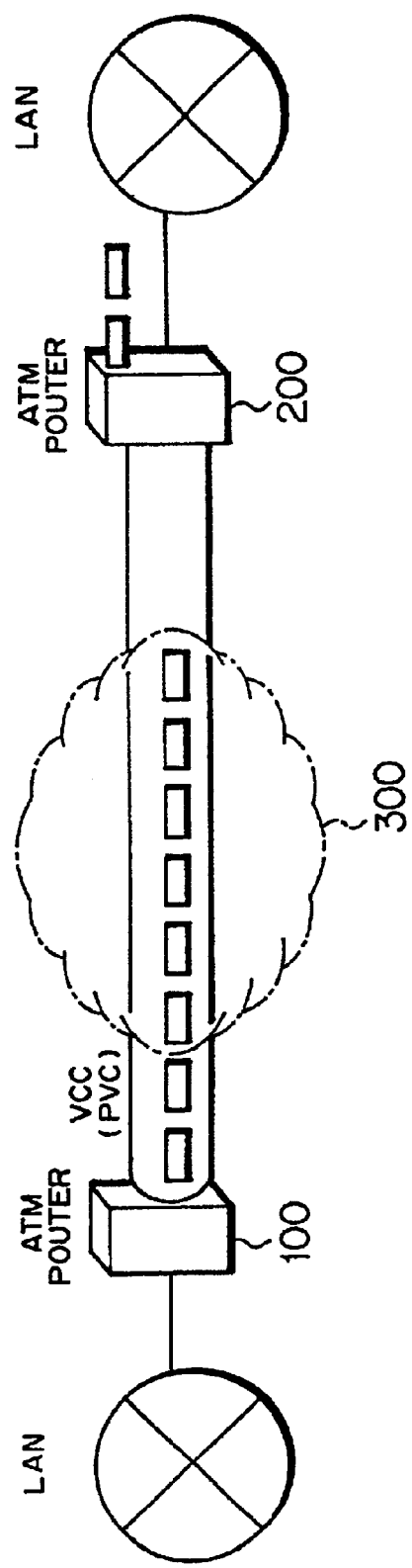
FIG. 24 is a block diagram illustrating the construction of an example of an ATM communication system.

Incidentally, the above signaling function unit 17 realizes the aforementioned first and second signaling control units, and operates in the case of the SVC service. The signaling function unit 17 controls transmission and reception of signaling messages such as SETUP signals and CONNECT signals (as illustrated in FIG. 23) based on a connection control table 171, in order to establish a connection which is required (specified by information in the routing table 121) at the beginning of the communication through a public line between endsystems 2-2 and 3-2. In addition, the signaling function unit 17 has the following functions.

(i) When the ATM router 2-2 is a transmitter-side endsystem, the signaling function unit 17 attaches to the SETUP signal (indicated in FIG. 23 as SETUP*1) information on the predetermined number of transmission cells for a VCC, where the information is to be sent to the receiver-side endsystem, and is stored for the VCC in the predetermined-cell-number storing unit 16D-1 in the flow-amount notification unit 16D.

(ii) When the ATM router 2-2 is a receiver-side endsystem, the signaling function unit 17 stores the predetermined number in the predetermined-cell-number storing unit 16D-1 in the receiver-side endsystem for the above VCC, based on the above information on the predetermined number of transmission cells, which is attached to the SETUP signal received from the transmitter-side endsystem 3-2. At this time, the signaling function unit 17 may attach to a response signal (e.g. a CONNECT signal, was indicated in FIG. 23 by CONNECT*2) which is to be transmitted to the transmitter-side endsystem 3-2, information which indicates a consent to a request for storing the received predetermined number in the predetermined-cell-number storing unit 16D-1.

In the transmitter-side endsystem 2-2, the above signaling messages are transformed into ATM cells by the cell assembler unit 132, and are then transmitted through the cell-insert-and-extract unit 15-2 to the opposite endsystem. On the other hand, in the receiver-side endsystem, signaling messages in the form of ATM cells transmitted from the opposite endsystem are disassembled by the cell disassembler unit 131, and the contents of the information in the ATM cells are supplied to the signaling function unit 17.

Figure 21:
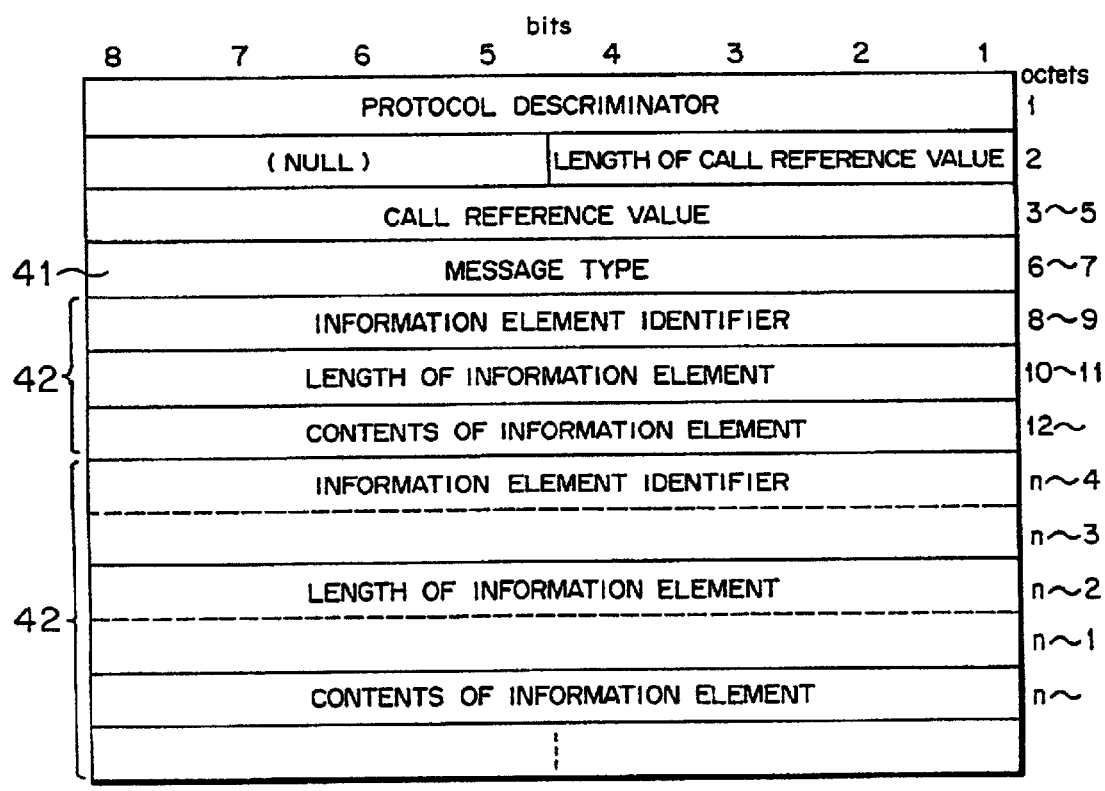
FIG. 21 is a diagram illustrating a format of the signaling message for UNI in the second embodiment of the present invention.
Figure 22:
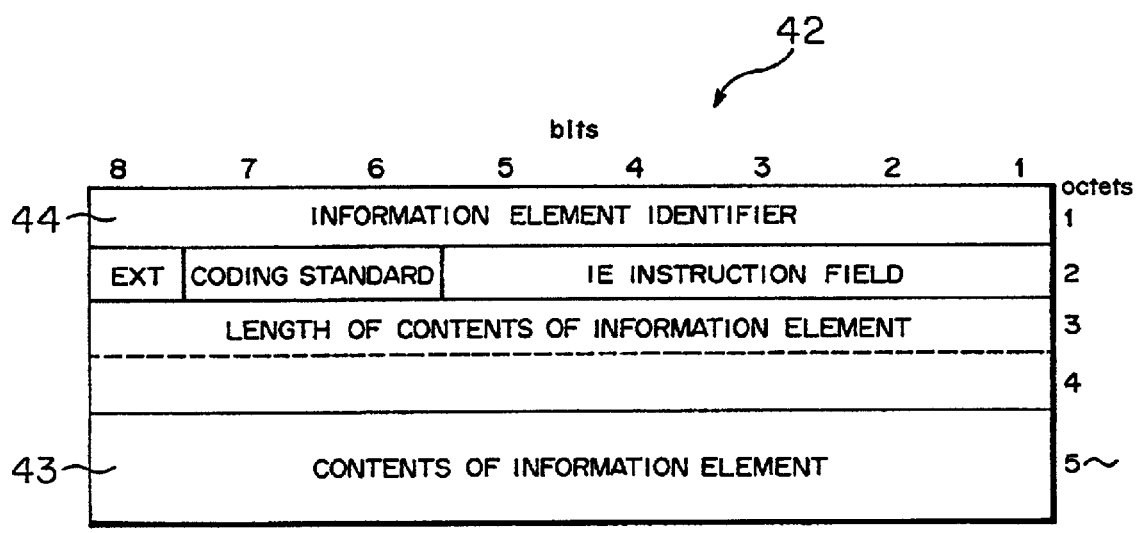
FIG. 22 is a diagram illustrating a basic format of an information element in the second embodiment of the present invention.

FIG. 21 shows an example of format of the signaling message for UNI (User Network Interface) in accordance with ITU-T standard, and FIG. 22 shows a basic format of an information element in the format of FIG. 21. As indicated in FIG. 21, MESSAGE TYPE information is written in the message type field 41, where the MESSAGE TYPE information indicates what type of message, SETUP signal, or CONNECT signal, or CONNECT ACK signal, the signaling message contains. Following the message type field 41, information elements 42 having the format as indicated in FIG. 22 can be attached to the signaling message, according to the information MESSAGE TYPE.

In the second embodiment, an information element 42' containing an information element identifier 44 and contents of the information element 43 in the format of FIG. 22 is newly defined. That is, the above information on the predetermined number (of transmission cells) is written in the field of contents of the information element 43 in the information element 42', and this information element 42' is attached to the SETUP signal. Thus, the above operation for storing the information on the predetermined number in the opposite endsystem can be performed.

Usually, the network 4 and the receiver-side endsystem 3-2 is constructed so as to ignore unrecognizable information element 42' which is out of standard. Therefore, the above attachment of the newly defined information element 42' to the SETUP signal causes no problem in the operation of the ATM communication system.

As described above, in the ATM communication system as the second embodiment of the present invention, the operation of storing the above predetermined number in the endsystems 2-2 and 3-2 can be performed automatically by using the signaling messages. Therefore, load imposed on maintenance technicians can be reduced.

V. Other Matters

In the first and second embodiments of the present invention, the detection of a congestion state (cell loss) by transmission of the flow-amount notification cell and the congestion notification cell, the control of the transmission cell rate (including the priority control), and the like are performed for each VCC. However, the above operations may be performed for each of other transmission units through which cells can be transported, e.g., the above operations maybe performed for each virtual path connection (VPC).

In addition, in the first and second embodiments, the transmitter-side endsystem performs the rate control only on a VCC in which a congestion state is detected or relieved, for efficiently utilize resources in the network. However, the rate control may be performed on all or a portion of VCCS.

In the first and second embodiments, the ATM routers are constructed to function as both a transmitter-side endsystem and a receiver-side endsystem. However, each ATM router may be constructed to function as only one of a transmitter-side endsystem and a receiver-side endsystem. In this case, congestion in the ATM communication network can be detected when the transmitter-side endsystem is provided with the flow-amount notification unit 16A or 16D and the cell counter 151 which is constructed to count the number of transmission cells only, and the receiver-side endsystem is provided with the congestion detection unit 16B or 16E and the cell counter 151 which is constructed to count the number of reception cells only.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An ATM communication system having an ATM communication network and a plurality of ATM communication apparatuses connected to the ATM communication network, where data is transmitted from a first one of the plurality of ATM communication apparatuses to a second one of the plurality of ATM communication apparatuses through a logical connection set in the ATM communication network;

said first one of the plurality of ATM communication apparatuses comprising:

a transmission-data-amount counting unit which counts an amount of transmission data to the logical connection, a notification processing unit which sends to the second one of the plurality of ATM communication apparatuses a notification containing said amount of transmission data counted by the transmission-data-amount counting unit, and a notification-interval control unit which controls intervals of notifications of the amount of transmission data for each logical connection in the ATM communication network so as to lengthen or shorten the interval of notification; and said second one of the plurality of ATM communication apparatuses comprising:

a reception-data-amount counting unit which counts an amount of reception data which have been received from the logical connection, and a congestion-state detecting unit which can detect a congestion state of the ATM communication network by comparing said amount of transmission data contained in the notification, with said amount of reception data counted by the reception-data-amount counting unit.

2. An ATM communication system according to claim 1, wherein said notification processing unit in the first one of the plurality of ATM communication apparatuses comprises a notification-data generation unit which generates data representing said notification to be sent to the second one of the plurality of ATM communication apparatuses, and said congestion-state detection unit in the second one of the plurality of ATM communication apparatuses comprises, a transmission-data-amount recognizing unit which recognizes the amount of transmission data contained in the data representing said notification, a data-amount comparing unit which compares the amount of transmission data recognized by the transmission-data-amount recognizing unit, with the amount of reception data counted by the reception data-amount counting unit, and congestion-state determining unit which determines that the ATM communication network is in a congestion state when a result of the operation by the data-amount comparing unit indicates that the amount of transmission data is different from the amount of reception data.

3. An ATM communication system according to claim 1, wherein the second one of the plurality of ATM communication apparatuses comprises a congestion-state notification unit which notifies the first one of the plurality of ATM communication apparatuses of a congestion state when the congestion state is detected by the congestion-state detection unit.

4. An ATM communication system according to claim 3, wherein the first one of the plurality of ATM communication apparatuses comprises a transmission-data-amount control unit which controls a transmission rate of at least the data transmitted to the logical connection to be reduced when the first one of the plurality of ATM communication apparatuses is notified of the congestion state by the congestion-state notification it in the second one of the plurality of ATM communication apparatuses.

5. A congestion state detection method for detecting a congestion state in an ATM communication system having an ATM communication network and a plurality of ATM communication apparatuses connected to the ATM communication network, where data is transmitted from a first one of the plurality of ATM communication apparatuses to a second one of the plurality of ATM communication apparatuses through a logical connection set in the ATM communication network, said method comprising the steps of:

(a) sending from said first one of the plurality of ATM communication apparatuses to the second one of the plurality of ATM communication apparatuses a notification containing an amount of transmission data to the logical connection;

(b) detecting a congestion state of the ATM communication network by comparing said amount of transmission data contained in the notification from the first one of the plurality of ATM communication apparatuses, with an amount of reception data which have been actually received by the second one of the plurality of ATM communication apparatuses; and (c) controlling intervals of notifications of the amount of transmission data for each logical connection in the ATM communication network so as to lengthen or shorten the interval of notification.

6. A congestion state detection method according to claim 5, wherein said second one of the plurality of ATM communication apparatuses notifies the first one of the plurality of ATM communication apparatuses of a congestion state when the second one of the plurality of ATM communication apparatuses detects the congestion state, and said first one of the plurality of ATM communication apparatuses controls a transmission rate of at least the data transmitted to the logical connection to be reduced when the first one of the plurality of ATM communication apparatuses is notified of the congestion state by the second one of the plurality of ATM communication apparatuses.

7. A transmitter-side ATM communication apparatus connected to an ATM communication network, where data is transmitted from said transmitter-side ATM communication apparatus to a receiver-side ATM communication apparatus through a logical connection set in the ATM communication network; said transmitter-side ATM communication apparatus comprising:

a transmission-data-amount counting unit which counts an amount of transmission data to the logical connection;

a notification processing unit which sends to the receiver-side ATM communication apparatus a notification containing said amount of transmission data counted by the transmission-data-amount counting unit, so that said receiver-side ATM communication apparatus can detect a congestion state of the ATM communication network by comparing said amount of transmission data with an amount of reception data which have been actually received by the receiver-side ATM communication apparatus; and a notification-interval control unit which controls intervals of notifications of the amount of transmission data for each logical connection in the ATM communication network so as to lengthen or shorten the interval of notification.

8. A transmitter-side ATM communication apparatus according to claim 7, wherein said notification processing unit comprises a notification-data generation unit which generates data representing said notification to be sent to the receiver-side ATM communication apparatus.

9. A transmitter-side ATM communication apparatus according to claim 8, wherein said notification-data generation unit generates an RM cell or a loopback (LB) cell as said data representing said notification.

10. A transmitter-side ATM communication apparatus according to claim 7, wherein the transmitter-side ATM communication apparatus comprises a transmission-data-rate control unit which controls a transmission rate of at least the data transmitted to the logical connection to be reduced when the transmitter-side ATM communication apparatus is notified of the congestion state of the ATM communication network by the receiver-side ATM communication apparatus.

11. A transmitter-side ATM communication apparatus according to claim 10, further comprising a priority-nonpriority recognition unit which recognizes priority or nonpriority of transmission data to be transmitted to a logical connection, based on attributes of the transmission data, and said transmission-data-rate control unit being constructed so as to place high priority on reduction of a transmission rare of transmission data whose nonpriority is recognized by the priority-nonpriority recognition unit.

12. A transmitter-side ATM communication apparatus according to claim 10, wherein said transmission-data-rate control unit is constructed so as to increase the transmission rate of at least the data transmitted to the logical connection when the transmitter-side ATM communication apparatus is notified of recovery from a congestion state by the receiver-side ATM communication apparatus after the transmitter-side ATM communication apparatus is notified of the congestion state by the receiver-side ATM communication apparatus.

13. A transmitter-side ATM communication apparatus according to claim 12, wherein said transmission-data-rate control unit is constructed so as to increase the transmission rate of the data transmitted to the logical connection, step by step, to a transmission rate of the data before the transmitter-side ATM communication apparatus is notified of the congestion state by the receiver-side ATM communication apparatus.

14. A transmitter-side ATM communication apparatus according to claim 10, wherein said transmission-data-rate control unit is constructed so as to increase the transmission rate of at least the data transmitted to the logical connection when a predetermined time has elapsed without receiving a notification of a congestion state after the transmitter-side ATM communication apparatus is notified of a congestion state by the receiver-side ATM communication apparatus.

15. A transmitter-side ATM communication apparatus according to claim 14, wherein said transmission-data-rate control unit is constructed so as to increase the transmission rate of the data transmitted to the logical connection, step by step, to a transmission rate of the data before the transmitter-side ATM communication apparatus is notified of the congestion state by the receiver-side ATM communication apparatus.

16. A transmitter-side ATM communication apparatus according to claim 10, wherein said transmission-data-rate control unit also controls a transmission rate of at least the data transmitted to the logical connection to be reduced when the transmitter-side ATM communication apparatus is notified of a congestion state of the receiver-side ATM communication apparatus.

17. A transmitter-side ATM communication apparatus according to claim 7, wherein said notification-interval control unit is constructed to control the intervals of the notifications so that the intervals of the notifications when the transmitter-side ATM communication apparatus is notified of a congestion state are longer than the intervals of the notifications when the transmitter-side ATM communication apparatus is not notified of a congestion state.

18. A receiver-side ATM communication apparatus connected to an ATM communication network, where data is transmitted from a transmitter-side ATM communication apparatus to said receiver-side ATM communication apparatus through a logical connection set in the ATM communication network; said receiver-side ATM communication apparatus comprising:

a reception-data-amount counting unit which counts an amount of reception data which have been received from the logical connection;

a congestion-state detecting unit which can detect a congestion state of the ATM communication network by comparing said amount of transmission data transmitted from the transmitter-side ATM communication apparatus to the logical connection, with said amount of reception data counted by the reception-data-amount counting unit, when said amount of transmission data is sent from the transmitter-side ATM communication apparatus, wherein the transmitter-side ATM communication apparatus controls intervals of notifications of the amount of transmission data for each logical connection in the ATM communication network so as to lengthen or shorten the interval of notification.

19. A receiver-side ATM communication apparatus according to claim 18, wherein said congestion-state detection unit comprises, a transmission-data-amount recognizing unit which recognizes the amount of transmission data contained in said notification, a data-amount comparing unit which compares the amount of transmission data recognized by the transmission-data-amount recognizing unit, with the amount of reception data counted by the reception-data-amount counting unit, and a congestion-state determining unit which determines that the ATM communication network is in a congestion state when a result of the operation of the data-amount comparing unit indicates that the amount of transmission data is different from the amount of reception data.

20. A receiver-side ATM communication apparatus according to claim 18, further comprising a congestion-state notification unit which notifies the transmitter-side ATM communication apparatus of a congestion state when the congestion state is detected by the congestion-state detection unit.

21. A receiver-side ATM communication apparatus according to claim 20, wherein said congestion-state notification unit comprises a notification-data transformation unit which transforms data representing said notification received from the transmitter-side ATM communication apparatus, into a form suitable for a notification of the congestion state which is to be sent to the transmitter-side ATM communication apparatus.

22. A receiver-side ATM communication apparatus according to claim 21, wherein said notification-data transformation unit is constructed so as to perform the operation of transforming the data, only when the congestion state is detected.

23. A receiver-side ATM communication apparatus according to claim 21, wherein the data representing said notification sent from the transmitter-side ATM communication apparatus is contained in a resource management (RM) cell or a loopback (LB) cell, and said notification-data transformation unit is constructed as a cell returning unit which attaches information on the congestion state to the RM cell or the loopback cell, and returns to the transmitter-side ATM communication apparatus the RM cell or the LB cell as a cell containing the data representing the notification of the congestion state.

24. A receiver-side ATM communication apparatus according to claim 20, wherein the congestion-state notification unit comprises a user-data-utilizing congestion-state notification unit which notifies the transmitter-side ATM communication apparatus of the congestion state by utilizing user data which are to be transmitted to the transmitter-side ATM communication apparatus.

25. A receiver-side ATM communication apparatus according to claim 20, wherein said congestion-state notification unit comprises a recovery notification unit which sends a recovery notification to the transmitter-side ATM communication apparatus when a congestion state detected by the congestion-state detection unit has changed to a noncongestion state.

26. A receiver-side ATM communication apparatus according to claim 20, wherein said congestion-state detection unit comprises a self-congestion-state detection unit which detects a congestion state of the receiver-side ATM communication apparatus, and said congestion-state notification unit comprises a self-congestion-state notification unit which notifies the transmitter-side ATM communication apparatus of the congestion state of the receiver-side ATM communication apparatus, when the self-congestion-state detection unit detects the congestion state of the receiver-side ATM communication apparatus.

* * * * *